(12) United States Patent
Li et al.

(10) Patent No.: US 10,286,572 B2
(45) Date of Patent: May 14, 2019

(54) FLOW SPLITTER FOR SLURRY DISTRIBUTION SYSTEM

(71) Applicant: United States Gypsum Company, Chicago, IL (US)

(72) Inventors: Alfred Li, Naperville, IL (US); Chris C. Lee, Deerfield, IL (US); Cesar Chan, Libertyville, IL (US); Ronald E. Schenck, Valparaiso, IN (US); Weixin D. Song, Vernon Hills, IL (US); Curt Loring, Valparaiso, IN (US); James Wittbold, Des Plaines, IL (US); William Rago, Gurnee, IL (US)

(73) Assignee: United States Gypsum Company, Chicago, IL (US)

( * ) Notice: Subject to any disclaimer, the term of this patent is extended or adjusted under 35 U.S.C. 154(b) by 826 days.

(21) Appl. No.: 13/659,423

(22) Filed: Oct. 24, 2012

(65) Prior Publication Data

US 2013/0098268 A1    Apr. 25, 2013

Related U.S. Application Data

(60) Provisional application No. 61/550,827, filed on Oct. 24, 2011, provisional application No. 61/550,857, (Continued)

(51) Int. Cl.
*B32B 5/20* (2006.01)
*B28B 19/00* (2006.01)
(Continued)

(52) U.S. Cl.
CPC ............ *B28B 19/0092* (2013.01); *B29B 7/74* (2013.01); *B29B 7/76* (2013.01); *F16L 41/023* (2013.01); *Y10T 137/85938* (2015.04)

(58) Field of Classification Search
CPC ......... B28B 19/0092; B29B 7/74; B29B 7/76; F16L 41/023
(Continued)

(56) References Cited

U.S. PATENT DOCUMENTS 1,452,702 A    4/1923  Pipe
2,097,613 A    11/1937 Batcheller
(Continued)

FOREIGN PATENT DOCUMENTS

AT    402826 B       7/1997
CN    1954166 A      4/2007
(Continued)

OTHER PUBLICATIONS

U.S. Appl. No. 13/659,516, filed Oct. 24, 2012.
(Continued)

*Primary Examiner* — Joseph S Del Sole
*Assistant Examiner* — John Robitaille
(74) *Attorney, Agent, or Firm* — Leydig, Voit & Mayer, Ltd.; Philip T. Petti; Pradip K. Sahu

(57) ABSTRACT

A flow splitter can include an inlet conduit and first and second outlet conduits separated by a junction portion. The inlet conduit can include an inlet end and a junction end. The inlet conduit is disposed along a main flow axis extending between the inlet end and the junction end. The inlet end defines an inlet opening. The junction end defines first and second junction openings. The first junction opening is disposed in spaced relationship to the second junction opening. The junction portion is disposed at the junction end of the inlet conduit between the first and second junction openings. The junction portion includes a substantially planar wall region that is substantially perpendicular to the main flow axis. The flow splitter can be placed in fluid communication with a cementitious slurry mixer and a
(Continued)

slurry distributor with the flow splitter disposed therebetween.

24 Claims, 11 Drawing Sheets

Related U.S. Application Data filed on Oct. 24, 2011, provisional application No. 61/550,873, filed on Oct. 24, 2011.

(51) Int. Cl.
    *F16L 41/02* (2006.01)
    *B29B 7/74* (2006.01)
    *B29B 7/76* (2006.01)

(58) Field of Classification Search
    USPC .......................................................... 156/43
    See application file for complete search history.

(56) References Cited

U.S. PATENT DOCUMENTS

| | | |
|---|---|---|
| 2,203,072 A | 6/1940 | Albright |
| 2,660,416 A | 11/1953 | Camp et al. |
| 2,700,622 A | 1/1955 | Burwell |
| 2,882,716 A | 4/1959 | Anderson |
| 2,998,198 A | 8/1961 | Young |
| 3,053,314 A | 9/1962 | McGillis et al. |
| 3,083,756 A | 4/1963 | Page et al. |
| 3,198,867 A | 8/1965 | Siggers |
| 3,296,346 A | 1/1967 | Shannon |
| 3,297,601 A | 1/1967 | Ptasieaski et al. |
| 3,359,146 A | 12/1967 | Lane et al. |
| 3,363,769 A | 1/1968 | Wilmot et al. |
| 3,380,333 A | 4/1968 | Clay et al. |
| 3,400,190 A | 9/1968 | Donald |
| 3,415,920 A | 12/1968 | Lee et al. |
| 3,432,588 A | 3/1969 | Breidt et al. |
| 3,458,907 A | 8/1969 | Shannon |
| 3,459,620 A | 8/1969 | McCleary et al. |
| 3,467,281 A | 9/1969 | Archer |
| 3,494,993 A | 2/1970 | Breidt et al. |
| 3,532,781 A | 10/1970 | Shannon |
| 3,558,380 A | 1/1971 | Pook |
| 3,583,681 A | 6/1971 | Brown |
| 3,602,405 A | 8/1971 | Ames |
| 3,644,169 A | 2/1972 | Phillips |
| 3,663,562 A | 5/1972 | Magerlein et al. |
| 3,740,027 A | 6/1973 | Kormos |
| 3,760,036 A | 9/1973 | Matthews |
| 3,781,320 A | 12/1973 | Irwin |
| 3,841,530 A | 10/1974 | Janninck |
| 3,909,170 A | 9/1975 | Riboulet et al. |
| 3,959,431 A | 5/1976 | Nissel |
| 3,959,432 A | 5/1976 | Wiley |
| 4,110,061 A | 8/1978 | Gerritsen |
| 4,113,829 A | 9/1978 | Bowker et al. |
| 4,153,403 A | 5/1979 | Schneider |
| 4,175,591 A | 11/1979 | Welker |
| 4,181,647 A | 1/1980 | Beach |
| 4,187,275 A | 2/1980 | Bracalielly et al. |
| 4,268,236 A | 5/1981 | Peille et al. |
| 4,279,673 A | 7/1981 | White et al. |
| 4,288,263 A | 9/1981 | Delcoigne et al. |
| 4,334,786 A | 6/1982 | Delcoigne et al. |
| 4,354,885 A | 10/1982 | White |
| 4,361,254 A | 11/1982 | Teraoku et al. |
| 4,364,790 A | 12/1982 | Delcoigne et al. |
| 4,392,613 A | 7/1983 | Graff et al. |
| 4,474,477 A | 10/1984 | Smith et al. |
| 4,533,300 A | 8/1985 | Westerlund et al. |
| 4,557,261 A | 12/1985 | Rugheimer |
| 4,588,299 A | 5/1986 | Brown et al. |
| 4,618,294 A | 10/1986 | Brown |
| 4,664,611 A | 5/1987 | Kumar |
| 4,758,261 A | 7/1988 | Parker et al. |
| 4,819,878 A | 4/1989 | Bailey et al. |
| 4,827,921 A | 5/1989 | Rugheimer |
| 4,934,596 A | 6/1990 | Hilton et al. |
| 4,942,003 A | 7/1990 | Bold |
| 5,188,455 A | 2/1993 | Hammerstedt |
| 5,192,384 A | 3/1993 | Barrier et al. |
| 5,211,511 A | 5/1993 | Deal, Jr. |
| 5,211,965 A | 5/1993 | Kitagawa |
| 5,261,485 A | 11/1993 | Thornton et al. |
| 5,316,703 A | 5/1994 | Schrenk |
| 5,320,677 A | 6/1994 | Baig |
| 5,350,290 A * | 9/1994 | Honings ................... 425/311 |
| 5,386,943 A | 2/1995 | Peeters |
| 5,395,653 A | 3/1995 | Baum |
| 5,508,072 A | 4/1996 | Andersen et al. |
| 5,520,779 A | 5/1996 | Bold |
| 5,580,409 A | 12/1996 | Andersen et al. |
| 5,582,670 A | 12/1996 | Andersen et al. |
| 5,622,729 A | 4/1997 | Mower |
| 5,643,510 A | 7/1997 | Sucech |
| 5,660,903 A | 8/1997 | Andersen et al. |
| 5,660,904 A | 8/1997 | Andersen et al. |
| 5,665,442 A | 9/1997 | Andersen et al. |
| 5,679,381 A | 10/1997 | Andersen et al. |
| 5,683,635 A | 11/1997 | Sucech et al. |
| 5,709,593 A | 1/1998 | Guthrie et al. |
| 5,714,001 A | 2/1998 | Savoly et al. |
| 5,718,797 A | 2/1998 | Phillips et al. |
| 5,720,913 A | 2/1998 | Andersen et al. |
| 5,730,819 A | 3/1998 | Retti |
| 5,766,525 A | 6/1998 | Andersen et al. |
| 5,792,322 A | 8/1998 | Hergert et al. |
| 5,800,647 A | 9/1998 | Andersen et al. |
| 5,844,051 A | 12/1998 | Onzuka et al. |
| 5,879,486 A | 3/1999 | Philips et al. |
| 5,879,722 A | 3/1999 | Andersen et al. |
| 5,908,240 A | 6/1999 | Hood et al. |
| 5,972,426 A | 10/1999 | Kutsuzawa et al. |
| 5,997,691 A | 12/1999 | Gautam et al. |
| 6,057,000 A | 5/2000 | Cai |
| 6,059,444 A | 5/2000 | Johnson et al. |
| 6,123,445 A | 9/2000 | Grassi |
| 6,153,040 A | 11/2000 | Rohlf et al. |
| 6,286,422 B1 | 9/2001 | Lin et al. |
| 6,323,159 B1 | 11/2001 | Raza |
| 6,340,123 B1 | 1/2002 | Lee et al. |
| 6,342,284 B1 | 1/2002 | Yu et al. |
| 6,382,922 B1 | 5/2002 | Lewis et al. |
| 6,402,062 B1 | 6/2002 | Bendig et al. |
| 6,409,823 B1 | 6/2002 | Shake et al. |
| 6,416,695 B1 | 7/2002 | Miller |
| 6,427,877 B1 | 8/2002 | Trout |
| 6,471,799 B1 | 10/2002 | Sasaki et al. |
| 6,494,609 B1 | 12/2002 | Wittbold et al. |
| 6,524,388 B1 | 2/2003 | Yamada et al. |
| 6,616,985 B2 | 9/2003 | Powell et al. |
| 6,632,550 B1 | 10/2003 | Yu et al. |
| 6,635,214 B2 | 10/2003 | Rapacki et al. |
| 6,645,483 B2 | 11/2003 | McGhee |
| 6,699,364 B2 | 3/2004 | Song et al. |
| 6,752,895 B1 | 6/2004 | Song et al. |
| 6,774,146 B2 | 8/2004 | Savoly et al. |
| 6,800,131 B2 | 10/2004 | Yu et al. |
| 6,872,280 B2 | 3/2005 | Tanaka et al. |
| 6,874,930 B2 | 4/2005 | Wittbold et al. |
| 6,878,321 B2 | 4/2005 | Hauber et al. |
| 6,991,361 B2 | 1/2006 | Flood |
| 7,007,914 B2 | 3/2006 | Petersen et al. |
| 7,127,865 B2 | 10/2006 | Douglas |
| 7,160,389 B2 | 1/2007 | Gibson et al. |
| 7,172,403 B2 | 2/2007 | Burke |
| 7,296,919 B2 | 11/2007 | Petersen et al. |
| 7,364,676 B2 | 4/2008 | Sucech |
| 7,458,532 B2 | 12/2008 | Sloan |
| 7,475,599 B2 | 1/2009 | Frank et al. |
| 7,588,634 B2 | 9/2009 | Lynn et al. |

(56) References Cited

U.S. PATENT DOCUMENTS

| | | |
|---|---|---|
| 7,690,834 B2 | 4/2010 | Nakamura et al. |
| 7,718,019 B2 | 5/2010 | Wittbold et al. |
| 7,731,794 B2 | 6/2010 | Yu et al. |
| 7,736,720 B2 | 6/2010 | Yu et al. |
| 7,771,851 B2 | 8/2010 | Song et al. |
| 7,875,114 B2 | 1/2011 | Wittbold et al. |
| 7,875,192 B2 | 1/2011 | Eigenmann et al. |
| 7,980,922 B2 | 7/2011 | Kiesel et al. |
| 8,016,960 B2 | 9/2011 | Wittbold et al. |
| 8,030,377 B2 | 10/2011 | Dubey et al. |
| 8,038,790 B1 | 10/2011 | Dubey et al. |
| 8,057,915 B2 | 11/2011 | Song et al. |
| 8,062,741 B2 | 11/2011 | Tonyan et al. |
| 8,088,218 B2 | 1/2012 | Blackburn et al. |
| 8,119,207 B2 | 2/2012 | Rigaudon et al. |
| 8,142,859 B2 | 3/2012 | Domey et al. |
| 8,142,915 B2 | 3/2012 | Blackburn et al. |
| 8,177,541 B2 | 5/2012 | Fahey |
| 8,197,952 B2 | 6/2012 | Yu et al. |
| 8,257,489 B2 | 9/2012 | Yu et al. |
| 8,360,825 B2 | 1/2013 | Hsu et al. |
| 8,444,787 B2 | 5/2013 | Wittbold et al. |
| 8,475,762 B2 | 7/2013 | Li et al. |
| 8,597,426 B2 | 12/2013 | Lee et al. |
| 8,685,188 B2 | 4/2014 | Yamaji et al. |
| 8,801,852 B2 | 8/2014 | Lee et al. |
| 2002/0045074 A1 | 4/2002 | Yu et al. |
| 2003/0049450 A1 | 3/2003 | Song et al. |
| 2003/0068959 A1 | 4/2003 | Kajiwara et al. |
| 2003/0117891 A1 | 6/2003 | Wittbold et al. |
| 2003/0200714 A1 | 10/2003 | Minke et al. |
| 2004/0033314 A1 | 2/2004 | Rao et al. |
| 2004/0033324 A1 | 2/2004 | Meyer |
| 2004/0091406 A1 | 5/2004 | Wolfert et al. |
| 2004/0231916 A1 | 11/2004 | Englert et al. |
| 2005/0019618 A1 | 1/2005 | Yu et al. |
| 2005/0253098 A1 | 11/2005 | Petersen et al. |
| 2006/0035112 A1 | 2/2006 | Veeramasuneni et al. |
| 2006/0092759 A1 | 5/2006 | Petersen et al. |
| 2006/0198995 A1 | 9/2006 | Nideborn et al. |
| 2006/0243171 A1 | 11/2006 | Yu et al. |
| 2006/0244182 A1 | 11/2006 | Wittbold et al. |
| 2006/0244183 A1 | 11/2006 | Wittbold et al. |
| 2006/0278133 A1 | 12/2006 | Yu et al. |
| 2006/0283974 A1 | 12/2006 | Eguchi et al. |
| 2007/0022913 A1 | 2/2007 | Wang et al. |
| 2007/0048490 A1 | 3/2007 | Yu et al. |
| 2007/0048549 A1 | 3/2007 | Song et al. |
| 2007/0059513 A1 | 3/2007 | Yu et al. |
| 2007/0251628 A1 | 11/2007 | Yu et al. |
| 2008/0000392 A1 | 1/2008 | Blackburn et al. |
| 2008/0009565 A1 | 1/2008 | Wittbold et al. |
| 2008/0069762 A1 | 3/2008 | Lynn et al. |
| 2008/0090068 A1 | 4/2008 | Yu et al. |
| 2008/0110276 A1 | 5/2008 | Frank et al. |
| 2008/0141909 A1 | 6/2008 | Immordino et al. |
| 2008/0299413 A1 | 12/2008 | Song et al. |
| 2009/0090796 A1 | 4/2009 | Tian |
| 2009/0134550 A1 | 5/2009 | Dehennau et al. |
| 2009/0239977 A1 | 9/2009 | Dubey et al. |
| 2009/0257303 A1 | 10/2009 | Rayner et al. |
| 2009/0297765 A1 | 12/2009 | Domey et al. |
| 2010/0077939 A1 | 4/2010 | Trout |
| 2010/0081008 A1 | 4/2010 | Trout |
| 2010/0139528 A1 | 6/2010 | Yu et al. |
| 2010/0227073 A1 | 9/2010 | Frank et al. |
| 2010/0229714 A1 | 9/2010 | Tonyan et al. |
| 2010/0239886 A1 | 9/2010 | Yu et al. |
| 2010/0291305 A1 | 11/2010 | Wittbold et al. |
| 2011/0054053 A1 | 3/2011 | Lee et al. |
| 2011/0186664 A1 | 8/2011 | Lucas et al. |
| 2011/0192518 A1 | 8/2011 | Li |
| 2011/0195241 A1 | 8/2011 | Yu et al. |
| 2011/0211418 A1 | 9/2011 | Tassone et al. |
| 2011/0213043 A1 | 9/2011 | Blackburn et al. |
| 2011/0213085 A1 | 9/2011 | Tonelli et al. |
| 2011/0271903 A1 | 11/2011 | Durst et al. |
| 2011/0308432 A1 | 12/2011 | Wittbold et al. |
| 2012/0131857 A1 | 5/2012 | Ross-da Silva |
| 2012/0167805 A1 | 7/2012 | Wittbold et al. |
| 2012/0168527 A1 | 7/2012 | Li et al. |
| 2012/0170403 A1 | 7/2012 | Li et al. |
| 2012/0251813 A1 | 10/2012 | Yu et al. |
| 2012/0304545 A1 | 12/2012 | Park et al. |
| 2012/0308463 A1 | 12/2012 | Li et al. |
| 2013/0098268 A1 | 4/2013 | Li et al. |
| 2013/0099027 A1 | 4/2013 | Li et al. |
| 2013/0099418 A1 | 4/2013 | Li et al. |
| 2013/0100759 A1 | 4/2013 | Wittbold et al. |
| 2013/0216717 A1 | 8/2013 | Rago et al. |
| 2013/0233880 A1 | 9/2013 | Rago et al. |
| 2013/0308411 A1 | 11/2013 | Wittbold et al. |
| 2014/0073711 A1 | 3/2014 | Lee et al. |
| 2014/0090730 A1 | 4/2014 | Buettner et al. |
| 2015/0231799 A1 | 8/2015 | Wittbold et al. |
| 2017/0210029 A1 | 7/2017 | Li et al. |

FOREIGN PATENT DOCUMENTS

| | | |
|---|---|---|
| CN | 2928447 Y | 8/2007 |
| CN | 201015893 Y | 2/2008 |
| CN | 201685321 U | 12/2010 |
| CN | 203266908 U | 11/2013 |
| CN | 204076480 U | 1/2015 |
| CN | 203957095 U | 11/2016 |
| DE | 353695 | 5/1922 |
| DE | 3808698 A1 | 9/1989 |
| DE | 3932573 A1 | 4/1991 |
| DE | 29514043 U1 | 11/1995 |
| DE | 19757678 | 6/1999 |
| DE | 102008041423 | 2/2010 |
| DE | 202009014417 U1 | 2/2010 |
| DE | 202011100879 U1 | 6/2011 |
| DE | 102010010872 A1 | 9/2011 |
| EP | 0003705 | 2/1979 |
| EP | 0225261 A1 | 6/1987 |
| EP | 0997784 | 3/2000 |
| EP | 1085280 A1 | 3/2001 |
| EP | 1396696 A2 | 3/2004 |
| EP | 1491262 A2 | 12/2004 |
| EP | 2363269 A1 | 9/2011 |
| EP | 2514294 | 10/2012 |
| FR | 1357221 | 4/1964 |
| FR | 2112808 A5 | 6/1972 |
| GB | 1317359 A | 5/1973 |
| GB | 1420686 | 1/1976 |
| GB | 1520258 A | 8/1978 |
| GB | 2026372 A | 2/1980 |
| GB | 2044163 A | 10/1980 |
| GB | 2246694 A | 2/1992 |
| GB | 2410909 | 8/2005 |
| JP | 51-90356 U | 7/1976 |
| JP | 6190845 A | 7/1994 |
| JP | H0-752130 A | 2/1995 |
| JP | H0-788419 A | 4/1995 |
| JP | H08-281626 A | 10/1996 |
| JP | 9094814 A | 4/1997 |
| JP | H09141700 A | 6/1997 |
| JP | 9273421 A | 10/1997 |
| JP | H11-501002 A | 1/1999 |
| JP | 11148589 | 6/1999 |
| JP | H11-170235 A | 6/1999 |
| JP | H11-188301 A | 7/1999 |
| JP | 2001-062821 A | 3/2001 |
| JP | 2001-300933 A | 10/2001 |
| JP | 2004130672 | 4/2004 |
| JP | 2005-021894 A | 1/2005 |
| JP | 2005-211871 A | 8/2005 |
| JP | 2006095469 A | 4/2006 |
| JP | 2006334483 A | 12/2006 |
| JP | 2008-229560 A | 10/2008 |
| JP | 2009-045513 A | 3/2009 |
| RU | 2257294 A | 5/2005 |
| RU | 2313451 C2 | 12/2007 |

(56) References Cited

FOREIGN PATENT DOCUMENTS

| | | |
|---|---|---|
| SU | 1033204 A1 | 8/1983 |
| TW | I350228 B | 10/2011 |
| WO | WO 9324290 | 12/1993 |
| WO | WO 97/05305 A1 | 2/1997 |
| WO | WO 98/25069 A1 | 6/1998 |
| WO | WO 2004/101402 A1 | 11/2004 |
| WO | WO 2006/137800 A2 | 12/2006 |
| WO | WO 2010/142034 A1 | 12/2010 |
| WO | WO 2011134844 A1 | 11/2011 |
| WO | WO 2011/150455 A1 | 12/2011 |
| WO | WO 2011150455 A1 | 12/2011 |
| WO | WO 2012076526 | 6/2012 |
| WO | WO 2012/092534 A1 | 7/2012 |
| WO | WO 2012/092582 A1 | 7/2012 |
| WO | WO 2013/063044 A1 | 5/2013 |
| WO | WO 2013/063055 A2 | 5/2013 |
| WO | WO 2013/063073 A2 | 5/2013 |
| WO | WO 2013/063080 A2 | 5/2013 |
| WO | WO 2013/063055 A3 | 6/2013 |
| WO | WO 2014/066211 A1 | 5/2014 |
| WO | WO 2014/066283 A1 | 5/2014 |

OTHER PUBLICATIONS

U.S. Appl. No. 13/659,600, filed Oct. 24, 2012.
U.S. Appl. No. 13/659,672, filed Oct. 24, 2012.
U.S. Appl. No. 13/341,016, filed Dec. 30, 2011.
U.S. Appl. No. 13/341,209, filed Dec. 30, 2011.
Burrows, "A Decade's Experience of Gypsum Board Weight Reduction in the U.S.", 14. Internationale Baustofftagung (Weimar, Sep. 20-23, 2000), 1.0197-1.0207.
International Search Report and Written Opinion from PCT/US2012/061589 (dated Mar. 25, 2013).
Mueller et al., "Controlling Set Times during Gypsum Board Production: Advance Additive Solutions", Global Gypsum Conference, Oct. 2011.
Peterson, Kurt, "Engineered Gypsum Panels, the Development and Application of Densified Zones at the Paper, Core Interface of Gypsum Panels", Proceedings of Gypsum 2000, 6th International Conference on Natural and Synthetic Gypsum, Toronto, Canada, May 2000, pp. 9-1-9-16.
Teejet; "TeeJet LF 500 Slurry Controller", http://teejet.com/english/home/products/application-control-and-equipment/slurry-application-controls/teejet-lh-500-slurry-controller.aspx, accessed Jan. 8, 2015.

\* cited by examiner

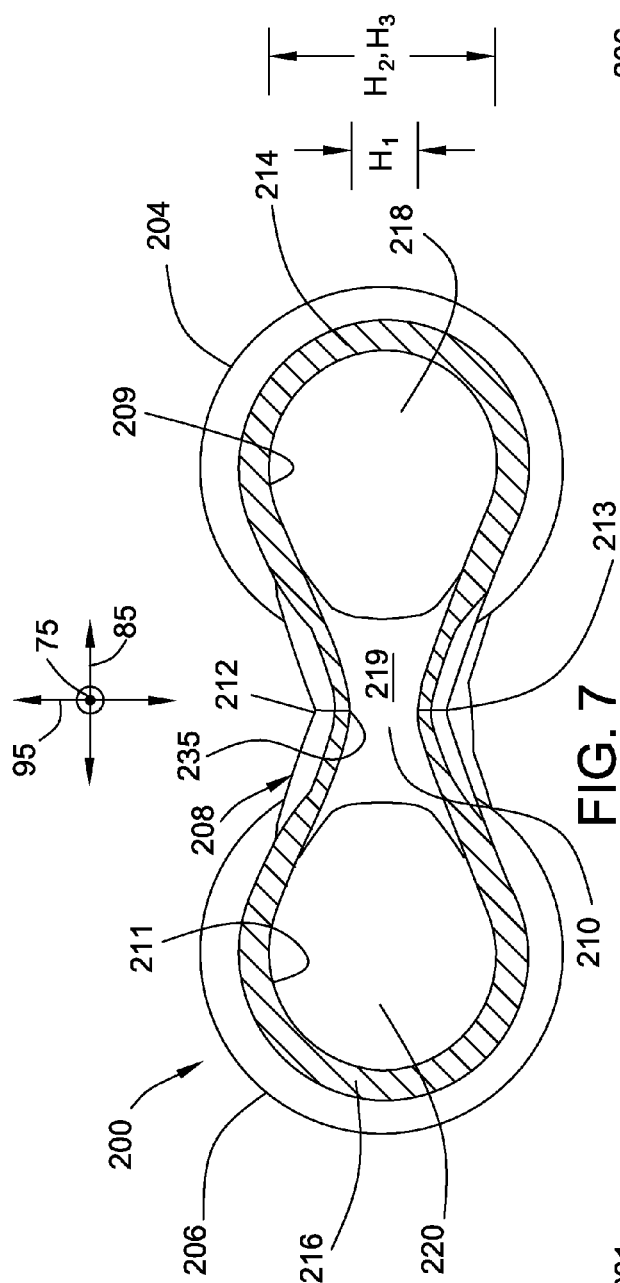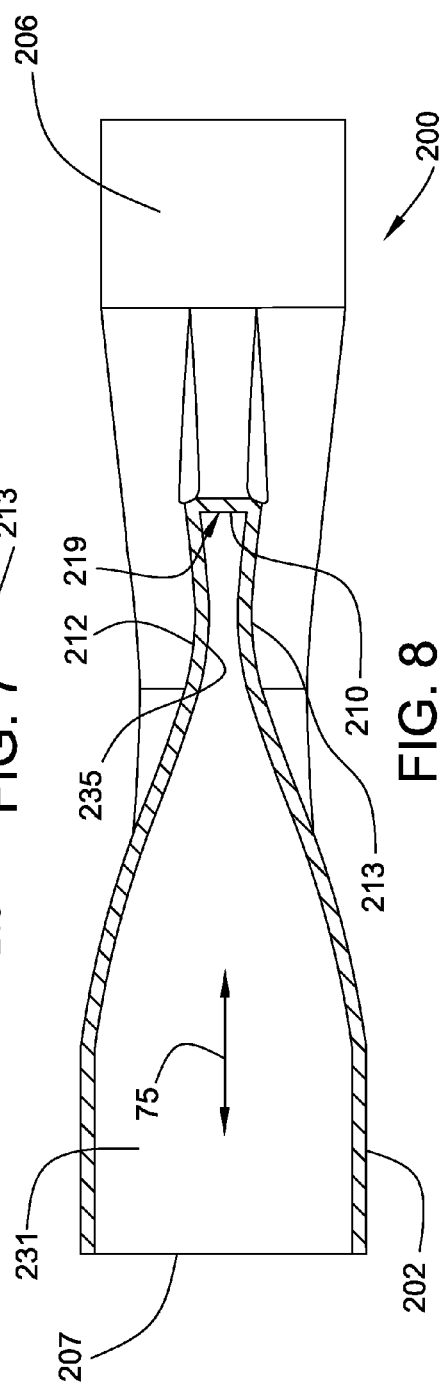

FLOW SPLITTER FOR SLURRY DISTRIBUTION SYSTEM

CROSS-REFERENCE TO RELATED APPLICATIONS

This patent application claims the benefit of priority to U.S. Provisional Patent Application Nos.
61/550,827, filed Oct. 24, 2011, and entitled, "Slurry Distributor, System, Method for Using, and Method for Making Same";
61/550,857, filed Oct. 24, 2011, and entitled, "Flow Splitter for Slurry Distribution System"; and
61/550,873, filed Oct. 24, 2011, and entitled, "Automatic Device for Squeezing Slurry Splitter,"
which are incorporated in their entireties herein by this reference.

BACKGROUND

The present disclosure relates to continuous board manufacturing processes and, more particularly, to an apparatus, system and method for the distribution of a slurry in connection with the manufacture of a cementitious article.

In many types of cementitious articles, set gypsum (calcium sulfate dihydrate) is often a major constituent. For example, set gypsum is a major component of end products created by use of traditional plasters (e.g., plaster-surfaced internal building walls), and also in faced gypsum board employed in typical drywall construction of interior walls and ceilings of buildings. In addition, set gypsum is the major component of gypsum/cellulose fiber composite boards and products, as described in U.S. Pat. No. 5,320,677. Set gypsum is also included in products that fill and smooth the joints between edges of gypsum board (see, e.g., U.S. Pat. No. 3,297,601). Also, many specialty materials, such as materials useful for modeling and mold-making that are precisely machined, produce products that contain major amounts of set gypsum. Typically, such gypsum-containing cementitious products are made by preparing a mixture of calcined gypsum (calcium sulfate alpha or beta hemihydrate and/or calcium sulfate anhydrite), water, and other components, as appropriate to form a cementitious slurry. In the manufacture of cementitious articles, the cementitious slurry and desired additives are often blended in a continuous mixer, as for example described in U.S. Pat. No. 3,359,146.

For example, in a typical gypsum panel manufacturing process, gypsum board is produced by uniformly dispersing calcined gypsum (commonly referred to as "stucco") in water to form an aqueous calcined gypsum slurry. The aqueous calcined gypsum slurry is typically produced in a continuous manner by inserting stucco and water and other additives into a mixer which contains means for agitating the contents to form a uniform gypsum slurry. The slurry is continuously directed toward and through a discharge outlet of the mixer and into a discharge conduit connected to the discharge outlet of the mixer. An aqueous foam can be combined with the aqueous calcined gypsum slurry in the mixer and/or in the discharge conduit. The stream of slurry passes through the discharge conduit from which it is continuously deposited onto a moving web of cover sheet material supported by a forming table.

The slurry is allowed to spread over the advancing web. A second web of cover sheet material is applied to cover the slurry and form a sandwich structure of a continuous wallboard preform, which is subjected to forming, such as at a conventional forming station, to obtain a desired thickness. The calcined gypsum reacts with the water in the wallboard preform and sets as a conveyor moves the wallboard preform down a manufacturing line. The wallboard preform is cut into segments at a point along the line where the preform has set sufficiently. The segments are flipped over, dried (e.g., in a kiln) to drive off excess water, and processed to provide the final wallboard product of desired dimensions.

Prior devices and methods for addressing some of the operational problems associated with the production of gypsum wallboard are disclosed in commonly-assigned U.S. Pat. Nos. 5,683,635; 5,643,510; 6,494,609; 6,874,930; 7,007,914; and 7,296,919, which are incorporated by reference.

The weight proportion of water relative to stucco that is combined to form a given amount of finished product is often referred to in the art as the "water-stucco ratio" (WSR). A reduction in the WSR without a formulation change will correspondingly increase the slurry viscosity, thereby reducing the ability of the slurry to spread on the forming table. Reducing water usage (i.e., lowering the WSR) in the gypsum board manufacturing process can yield many advantages, including the opportunity to reduce the energy demand in the process. However, conveying increasingly viscous gypsum slurries through a discharge conduit mounted to the mixer and spreading such slurries uniformly on the forming table remain a great challenge.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a flow splitter for use in preparing a cementitious product. The flow splitter can be placed in fluid communication with a slurry mixer and a slurry distributor with the flow splitter disposed therebetween. In one embodiment, a flow splitter can include an inlet conduit and first and second outlet conduits separated by a junction portion.

The inlet conduit can include an inlet end and a junction end. The inlet conduit is disposed along a main flow axis extending between the inlet end and the junction end. The inlet end defines an inlet opening. The junction end defines first and second junction openings. The first junction opening is disposed in spaced relationship to the second junction opening.

The first outlet conduit is in fluid communication with the first junction opening of the inlet conduit. The first outlet conduit includes a discharge end defining a first discharge opening.

The second outlet conduit is in fluid communication with the second junction opening of the inlet conduit. The second outlet conduit includes a discharge end defining a second discharge opening.

The junction portion is disposed at the junction end of the inlet conduit. The junction portion is disposed between the first junction opening and the second junction opening. The junction portion includes a substantially planar wall region. The wall region is substantially perpendicular to the main flow axis.

In another embodiment, a flow splitter can include an inlet conduit and first and second outlet conduits separated by a junction portion. The inlet conduit includes an inlet end and a junction end. The inlet conduit is disposed along a main flow axis extending between the inlet end and the junction end. The inlet end defines an inlet opening. The junction end defines first and second junction openings. The first junction opening is disposed in spaced relationship to the second junction opening. The inlet conduit defines an inlet passage extending between the inlet opening and the first and second junction openings.

The first outlet conduit is in fluid communication with the first junction opening of the inlet conduit. The first outlet conduit includes a discharge end defining a first discharge opening. The second outlet conduit is in fluid communication with the second junction opening of the inlet conduit. The second outlet conduit includes a discharge end defining a second discharge opening.

The junction portion is disposed at the junction end of the inlet conduit. The junction portion is disposed between the first junction opening and the second junction opening. The inlet conduit includes a contoured portion that defines a flow restriction in the inlet passage adjacent the junction portion.

In another aspect of the present disclosure, embodiments of a slurry mixing and dispensing assembly are described. In one embodiment, a slurry mixing and dispensing assembly includes a mixer, a delivery conduit, a flow splitter, and a slurry distributor.

The mixer is adapted to agitate water and a cementitious material (such as, calcined gypsum, e.g.) to form an aqueous cementitious slurry. The delivery conduit is in fluid communication with the mixer. The delivery conduit includes a common delivery trunk adapted to receive a main flow of aqueous cementitious slurry from the mixer.

The flow splitter is in fluid communication with the common delivery trunk. The flow splitter includes an inlet conduit, and first and second outlet conduits separated by a junction portion.

The inlet conduit includes an inlet end and a junction end. The inlet conduit is disposed along a main flow axis extending between the inlet end and the junction end. The inlet end defines an inlet opening in fluid communication with the common delivery trunk and is adapted receive the main flow of aqueous cementitious slurry from the common delivery trunk. The junction end defines first and second junction openings. The first junction opening is disposed in spaced relationship to the second junction opening. The first and second junction openings are adapted to split the main flow of aqueous cementitious slurry into a first feed flow of aqueous cementitious slurry and a second feed flow of aqueous cementitious slurry.

The first outlet conduit is in fluid communication with the first junction opening of the inlet conduit. The first outlet conduit includes a discharge end defining a first discharge opening. The first outlet conduit is adapted to receive the first feed flow of aqueous cementitious slurry from the inlet conduit and to dispense the first feed flow from the first discharge opening.

The second outlet conduit is in fluid communication with the second junction opening of the inlet conduit. The second outlet conduit includes a discharge end defining a second discharge opening. The second outlet conduit is adapted to receive the second feed flow of aqueous cementitious slurry from the inlet conduit and to dispense the second feed flow from the second discharge end.

The junction portion is disposed at the junction end of the inlet conduit. The junction portion is disposed between the first junction opening and the second junction opening. The junction portion includes a substantially planar wall region. The wall region is substantially perpendicular to the main flow axis.

The slurry distributor is in fluid communication with the flow splitter. The slurry distributor includes a first feed inlet adapted to receive the first feed flow of aqueous cementitious slurry from the first outlet conduit of the flow splitter, a second feed inlet in spaced relationship to the first feed inlet and adapted to receive the second flow of aqueous cementitious slurry from the second outlet conduit of the flow splitter, and a distribution outlet in fluid communication with both the first and the second feed inlets and adapted such that the first and second flows of aqueous cementitious slurry discharge from the slurry distributor through the distribution outlet.

In another embodiment, a cementitious slurry mixing and dispensing assembly includes a mixer, a delivery conduit, a flow splitter, and a slurry distributor. The mixer is adapted to agitate water and a cementitious material to form an aqueous cementitious slurry.

The delivery conduit is in fluid communication with the cementitious slurry mixer. The delivery conduit includes a common delivery trunk adapted to receive a main flow of aqueous cementitious slurry from the mixer.

The flow splitter is in fluid communication with the common delivery trunk. The flow splitter includes an inlet conduit and first and second outlet conduits separated by a junction portion. The inlet conduit include an inlet end and a junction end.

The inlet conduit is disposed along a main flow axis extending between the inlet end and the junction end. The inlet end defines an inlet opening in fluid communication with the common delivery trunk. The junction end defines first and second junction openings. The first junction opening is disposed in spaced relationship to the second junction opening. The first and second junction openings are adapted to split the main flow of aqueous cementitious slurry into a first feed flow of aqueous cementitious slurry and a second feed flow of aqueous cementitious slurry. The inlet conduit defines an inlet passage extending between the inlet opening and the first and second junction openings.

The first outlet conduit is in fluid communication with the first junction opening of the inlet conduit. The first outlet conduit includes a discharge end defining a first discharge opening. The first outlet conduit is adapted to receive the first feed flow of aqueous cementitious slurry from the inlet conduit and to dispense the first feed flow from the first discharge opening.

The second outlet conduit is in fluid communication with the second junction opening of the inlet conduit. The second outlet conduit includes a discharge end defining a second discharge opening. The second outlet conduit is adapted to receive the second feed flow of aqueous cementitious slurry from the inlet conduit and to dispense the second feed flow from the second discharge end.

The junction portion is disposed at the junction end of the inlet conduit. The junction portion is disposed between the first junction opening and the second junction opening. The inlet conduit includes a contoured portion that defines a flow restriction in the inlet passage adjacent the junction portion.

The slurry distributor is in fluid communication with the flow splitter. The slurry distributor includes a first feed inlet adapted to receive the first feed flow of aqueous cementitious slurry from the first outlet conduit of the flow splitter. The second feed inlet is in spaced relationship to the first feed inlet and adapted to receive the second flow of aqueous cementitious slurry from the second outlet conduit of the flow splitter. The distribution outlet is in fluid communication with both the first and the second feed inlets and adapted such that the first and second flows of aqueous cementitious slurry discharge from the slurry distributor through the distribution outlet.

In another aspect of the present disclosure, embodiments of a method of preparing a cementitious product are described. In one embodiment of a method of preparing a cementitious product, a main flow of aqueous cementitious slurry is discharged from a mixer. The main flow of aqueous cementitious slurry from the mixer is split into a first feed flow of aqueous cementitious slurry and a second feed flow of aqueous cementitious slurry. The first feed flow of aqueous cementitious slurry is passed through a first feed inlet of a slurry distributor. The second feed flow of aqueous cementitious slurry is passed through a second feed inlet of the slurry distributor. The second feed inlet is in spaced relationship to the first feed inlet. The first and second feed flows of aqueous cementitious slurry are recombined in the slurry distributor. The first feed flow of aqueous cementitious and the second feed flow of aqueous cementitious slurry each has an average velocity that is at least about 50% of the average velocity of the main flow of aqueous cementitious slurry.

Further and alternative aspects and features of the disclosed principles will be appreciated from the following detailed description and the accompanying drawings. As will be appreciated, the flow splitters disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 7 is a cross-sectional view of the flow splitter of FIG. 3 taken along line VII-VII in FIG. 6.

FIG. 8 is a cross-sectional view of the flow splitter of FIG. 3 taken along line VIII-VIII in FIG. 6.

DETAILED DESCRIPTION OF EXEMPLARY EMBODIMENTS

Figure 1:
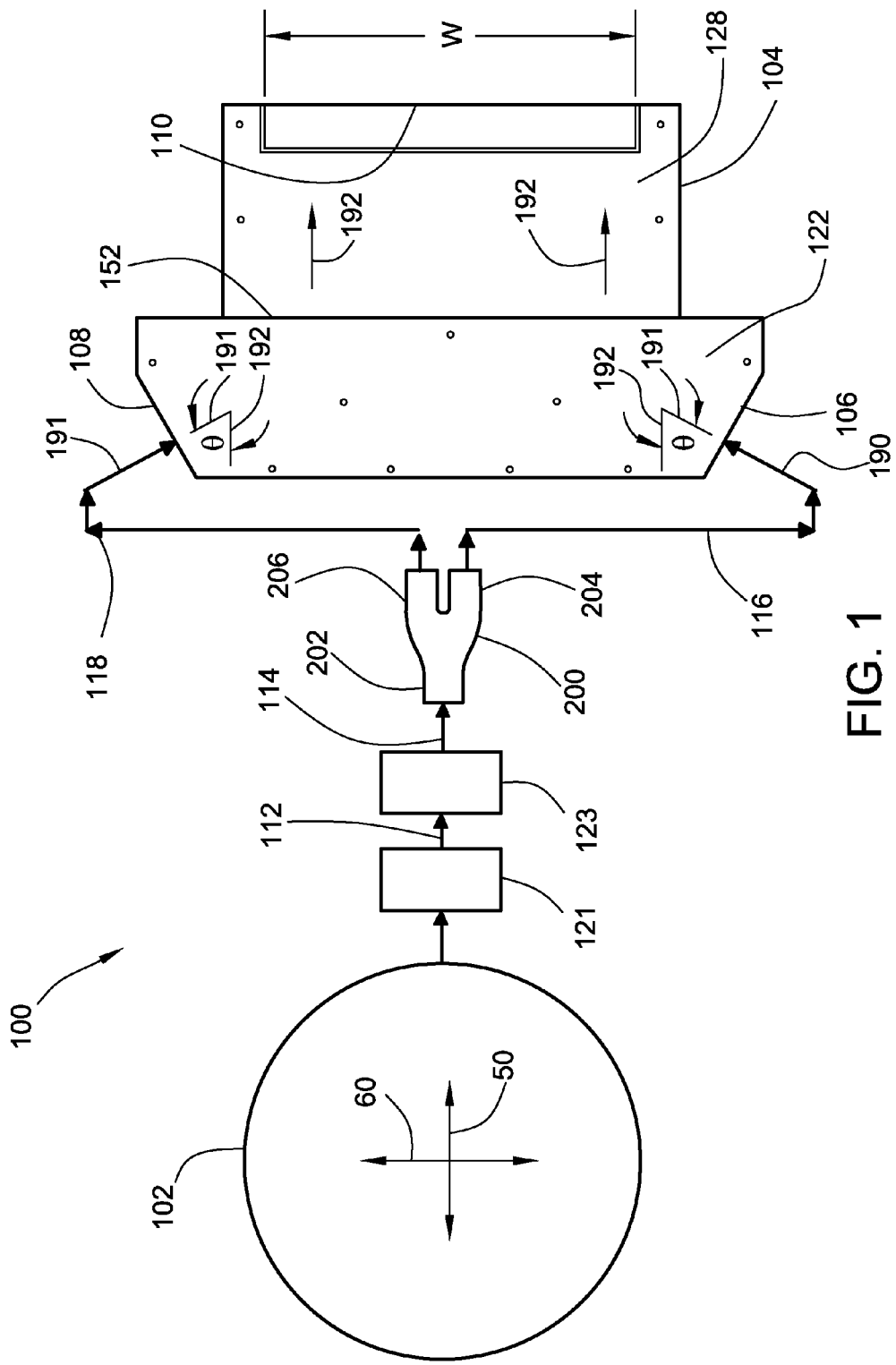
FIG. 1 is a schematic plan diagram of an embodiment of a cementitious slurry mixing and dispensing assembly including an embodiment of a flow splitter constructed in accordance with principles of the present disclosure.

The present disclosure provides various embodiments of a cementitious slurry mixing and dispensing assembly that can be used in the manufacture of products, including cementitious products such as gypsum wallboard, for example. Embodiments of a cementitious slurry mixing and dispensing assembly constructed in accordance with principles of the present disclosure can be used in a manufacturing process and include a flow splitter in a discharge conduit mounted to a mixer to effectively split a single flow of a multi-phase slurry—such as an aqueous foamed gypsum slurry containing air and liquid phases, for example—entering the flow splitter from the mixer such that at least two independent flows of the multi-phase slurry exit from the flow splitter.

Embodiments of a cementitious slurry mixing and dispensing assembly constructed in accordance with principles of the present disclosure can be used to mix and distribute a slurry (e.g., an aqueous calcined gypsum slurry) onto an advancing web (e.g., paper or mat) moving on a conveyor during a continuous board (e.g., wallboard) manufacturing process. In one aspect, a flow splitter constructed in accordance with principles of the present disclosure can be used in a conventional gypsum drywall manufacturing process as, or part of, a discharge conduit attached to a mixer adapted to agitate calcined gypsum and water to form an aqueous calcined gypsum slurry.

A cementitious slurry mixing and dispensing assembly according to principles of the present disclosure can be used to form any type of cementitious product, such as a board, for example. In some embodiments, a gypsum board, such as a gypsum drywall, a Portland cement board or an acoustical panel, for example, can be formed.

The cementitious slurry can be any conventional cementitious slurry, for example any cementitious slurry commonly used to produce gypsum wallboard, acoustical panels including, for example, acoustical panels described in U.S. Patent Application Publication No. 2004/0231916, or Portland cement board. As such, the cementitious slurry can optionally further comprise any additives commonly used to produce cementitious board products. Such additives include structural additives including mineral wool, continuous or chopped glass fibers (also referred to as fiberglass), perlite, clay, vermiculite, calcium carbonate, polyester, and paper fiber, as well as chemical additives such as foaming agents, fillers, accelerators, sugar, enhancing agents such as phosphates, phosphonates, borates and the like, retarders, binders (e.g., starch and latex), colorants, fungicides, biocides, hydrophobic agent, such as a silicone-based material (e.g., a silane, siloxane, or silicone-resin matrix), and the like. Examples of the use of some of these and other additives are described, for instance, in U.S. Pat. Nos. 6,342,284; 6,632,550; 6,800,131; 5,643,510; 5,714,001; and 6,774,146; and U.S. Patent Application Publication Nos. 2004/0231916; 2002/0045074; 2005/0019618; 2006/0035112; and 2007/0022913.

Non-limiting examples of cementitious materials include Portland cement, sorrel cement, slag cement, fly ash cement, calcium alumina cement, water-soluble calcium sulfate anhydrite, calcium sulfate α-hemihydrate, calcium sulfate β-hemihydrate, natural, synthetic or chemically modified calcium sulfate hemihydrate, calcium sulfate dihydrate ("gypsum," "set gypsum," or "hydrated gypsum"), and mixtures thereof. In one aspect, the cementitious material desirably comprises calcined gypsum, such as in the form of calcium sulfate alpha hemihydrate, calcium sulfate beta hemihydrate, and/or calcium sulfate anhydrite. In embodiments, the calcined gypsum can be fibrous in some embodiments and nonfibrous in others. The calcined gypsum can include at least about 50% beta calcium sulfate hemihydrate. In other embodiments, the calcined gypsum can include at least about 86% beta calcium sulfate hemihydrate. The weight ratio of water to calcined gypsum can be any suitable ratio, although, as one of ordinary skill in the art will appreciate, lower ratios can be more efficient because less excess water must be driven off during manufacture, thereby conserving energy. In some embodiments, the cementitious slurry can be prepared by combining water and calcined gypsum in a range from about a 1:6 ratio by weight respectively to about 1:1 ratio, such as about 2:3, for board production depending on products.

Turning now to the Figures, FIG. 1 shows an embodiment of a cementitious slurry mixing and dispensing assembly 100 that includes a cementitious slurry mixer 102 in fluid communication with a flow splitter 200 and slurry distributor 104. The cementitious slurry mixer 102 is adapted to agitate water and a cementitious material to form an aqueous cementitious slurry. Both the water and the cementitious material can be supplied to the mixer 102 via one or more inlets as is known in the art. Any suitable mixer (e.g., a pin mixer) can be used with the slurry mixing and dispensing assembly 100.

The flow splitter 200 is disposed between the cementitious slurry mixer 102 and the slurry distributor 104 and is in fluid communication with both the cementitious slurry mixer 102 and the slurry distributor 104. The flow splitter 200 illustrated in FIG. 1 is adapted to separate an incoming main flow of cementitious slurry from the cementitious slurry mixer 102 into two substantially even feed flows that are directed to two separate feed inlets 106, 108 of the slurry distributor 104. The flow splitter 200 has a substantially cylindrical inlet conduit 202 adapted to receive the main flow of slurry from the mixer 102 and a pair of substantially cylindrical outlet conduits 204, 206 each in fluid communication with the inlet conduit 202 and adapted to dispense two outlet flows of slurry from the flow splitter 200 to the slurry distributor 104.

The slurry distributor 104 is in fluid communication with the cementitious slurry mixer 102 through the flow splitter 200. The slurry distributor 104 includes a first feed inlet 106 adapted to receive a first flow of aqueous cementitious slurry from the cementitious slurry mixer 102 through the first outlet 204 of the flow splitter 200, a second feed inlet 108 adapted to receive a second flow of aqueous cementitious slurry from the cementitious slurry mixer 102 through the second outlet 206 of the flow splitter 200, and a distribution outlet 110 in fluid communication with both the first and the second feed inlets 106, 108 and adapted such that the first and second flows of aqueous cementitious slurry discharge from the slurry distributor 104 through the distribution outlet 110 substantially along a machine direction 50.

Figure 2:
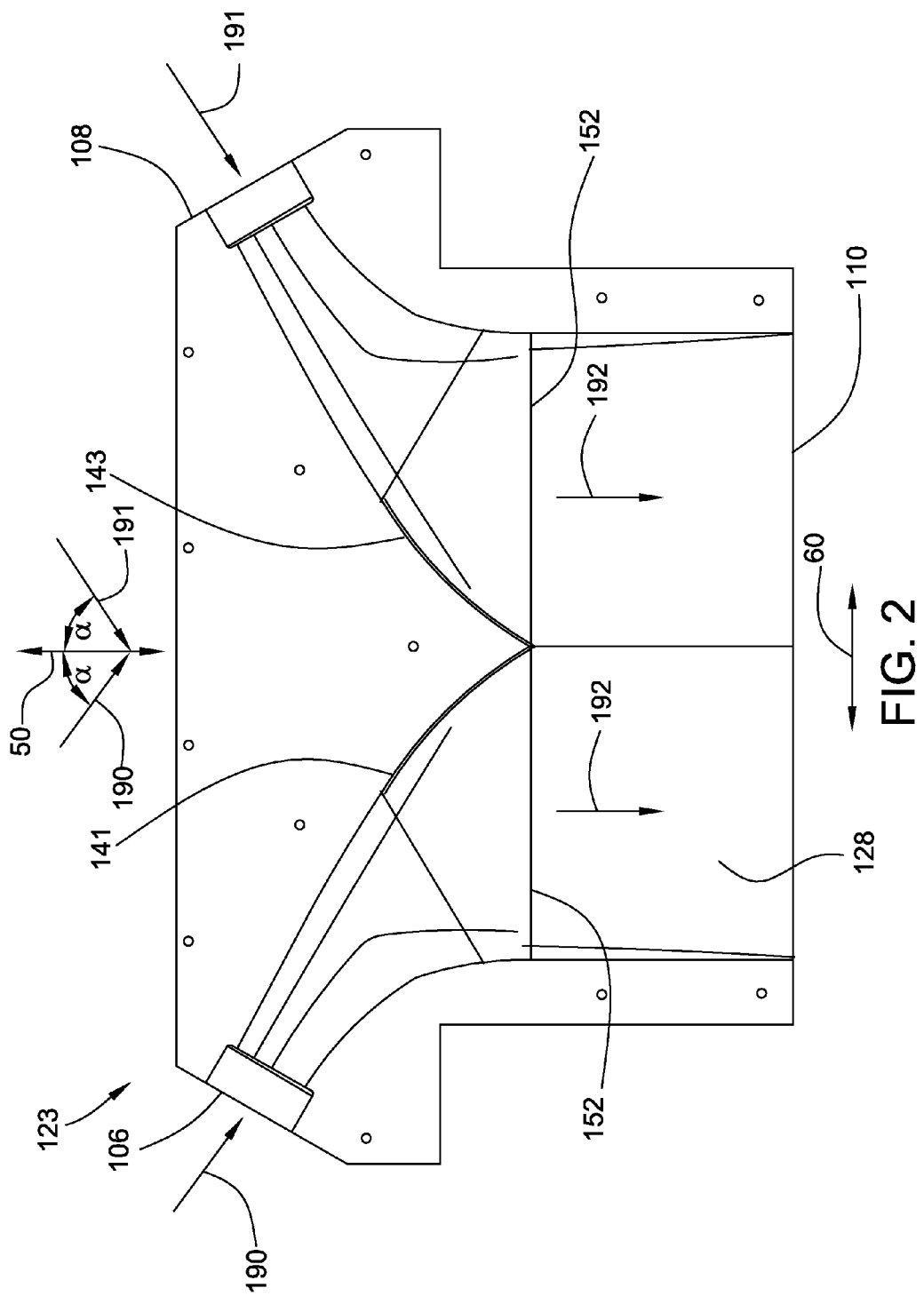
FIG. 2 is a top plan view of a first piece of the slurry distributor of the cementitious slurry mixing and dispensing assembly of FIG. 1, which has a two-piece construction wherein the other piece of the slurry distributor is substantially the same.

The slurry distributor 104 includes a feed conduit 122 in fluid communication with a distribution conduit 128. The feed conduit 122 includes the first feed inlet 106 and the second feed inlet 108 disposed in spaced relationship to the first feed inlet 106, which are both disposed at a feed angle θ of about 60° with respect to the machine direction 50. The feed conduit 122 includes structure 141, 143 therein adapted to receive the first and second flows of slurry moving along first and second feed flow directions 190, 191 and redirect the slurry flow direction by a change in direction angle α (see FIG. 2) such that the first and second flows of slurry are conveyed into the distribution conduit 128 moving substantially in the outlet flow direction 192, which is substantially aligned with the machine direction 50.

The distribution conduit 128 extends generally along the longitudinal axis or machine direction 50, which is substantially perpendicular to a transverse axis 60. The distribution conduit 128 includes an entry portion 152 and the distribution outlet 110. The entry portion 152 is in fluid communication with the first and second feed inlets 106, 108 of the feed conduit 122 such that the entry portion 152 is adapted to receive both the first and the second flows of aqueous cementitious slurry therefrom. The distribution outlet 110 is in fluid communication with the entry portion 152. The distribution outlet 110 of the distribution conduit 128 extends a predetermined distance W along the transverse axis 60 to facilitate the discharge of the combined first and second flows of aqueous cementitious slurry in the cross-machine direction along the transverse axis 60. The slurry distributor 104 can be similar in other respects to the slurry distributors described in U.S. patent application Ser. No. 13/341,209 (U.S. Patent Application Publication No. 2012/0170403), filed on Dec. 30, 2011, the entire contents of which are hereby incorporated by reference herein. In other embodiments, the slurry distributor 104 can take different forms, such as those described in U.S. Patent Application Publication No. 2012/0170403, for example.

A delivery conduit 112 is disposed between and in fluid communication with the cementitious slurry mixer 102, the flow splitter 200, and the slurry distributor 104. The delivery conduit 112 includes a common delivery trunk 114 in fluid communication with the cementitious slurry mixer 102 and the flow splitter 200, a first delivery branch 116 in fluid communication with the flow splitter 200 via the first outlet conduit 204 thereof and the first feed inlet 106 of the slurry distributor 104, and a second delivery branch 118 in fluid communication with the flow splitter 200 via the first outlet conduit 206 thereof and the second feed inlet 108 of the slurry distributor 104.

The common delivery trunk 114 is in fluid communication with both the first and second delivery branches 116, 118 through the flow splitter 200. The flow splitter 200 is disposed between the main delivery trunk 114 and the first delivery branch 116 and between the common delivery trunk 114 and the second delivery branch 118. In some embodiments, the flow splitter 200 can be adapted to help split the first and second flows of cementitious slurry such that they are substantially equal. In other embodiments, additional components can be added to help regulate the first and second flows of slurry, such as by adjusting the average velocity of each of the first and second flows and/or the volumetric flow rate of each of the first and second flows.

The delivery conduit 112 can be made from any suitable material and can have different shapes. In some embodiments, the delivery conduit can comprise a flexible conduit.

An aqueous foam supply conduit 121 can be in fluid communication with at least one of the cementitious slurry mixer 102 and the delivery conduit 112. An aqueous foam from a source can be added to the constituent materials through the foam supply conduit 121 at any suitable location downstream of the mixer 102 and/or in the mixer 102 itself to form a foamed cementitious slurry (e.g., a foamed aqueous calcined gypsum slurry) that is provided to the slurry distributor 104. In the illustrated embodiment, the foam supply conduit 121 is disposed downstream of the cementitious slurry mixer 102 and has a manifold-type arrangement for supplying foam to an injection ring or block associated with the delivery conduit 112 as described in U.S. Pat. No. 6,874,930, for example.

In other embodiments, one or more secondary foam supply conduits can be provided that are in fluid communication with the mixer 102. In yet other embodiments, the aqueous foam supply conduit(s) can be in fluid communication with the cementitious slurry mixer 102 alone. As will be appreciated by those skilled in the art, the means for introducing aqueous foam into the cementitious slurry in the cementitious slurry mixing and dispensing assembly 100, including its relative location in the assembly, can be varied and/or optimized to provide a uniform dispersion of aqueous foam in the cementitious slurry to produce board that is fit for its intended purpose.

Any suitable foaming agent can be used. Preferably, the aqueous foam is produced in a continuous manner in which a stream of the mix of foaming agent and water is directed to a foam generator, and a stream of the resultant aqueous foam leaves the generator and is directed to and mixed with the cementitious slurry. Some examples of suitable foaming agents are described in U.S. Pat. Nos. 5,683,635 and 5,643,510, for example.

When the foamed cementitious slurry sets and is dried, the foam dispersed in the slurry produces air voids therein which act to lower the overall density of the wallboard. The amount of foam and/or amount of air in the foam can be varied to adjust the dry board density such that the resulting wallboard product is within a desired weight range.

One or more flow-modifying elements 123 can be associated with the delivery conduit 112 are adapted to control a main flow of aqueous cementitious slurry from the cementitious slurry mixer 102. The flow-modifying element(s) 123 can be used to control an operating characteristic of the main flow of aqueous cementitious slurry. In the illustrated embodiment of FIG. 1, the flow-modifying element(s) 123 is associated with the common delivery trunk 114. Examples of suitable flow-modifying elements include volume restrictors, pressure reducers, constrictor valves, canisters etc., including those described in U.S. Pat. Nos. 6,494,609; 6,874,930; 7,007,914; and 7,296,919, for example.

In use, a main flow of aqueous cementitious slurry is discharged from the mixer 102 into the delivery conduit 112, aqueous foam is inserted into the main flow through the foam supply conduit 121, and the flow-modifying element(s) 123 controls an operating characteristic of the main flow of aqueous cementitious slurry. The main flow of aqueous cementitious slurry is directed into the inlet conduit 202 of the flow splitter 200. The main flow of aqueous cementitious slurry from the mixer 102 is split in the flow splitter 200 into the first feed flow of aqueous cementitious slurry and the second feed flow of aqueous cementitious slurry which are discharged therefrom via the first and second outlet conduits 204, 206, respectively. The flow splitter 200 can separate the incoming main flow of cementitious slurry from the cementitious slurry mixer 102 into two substantially even feed flows that are directed to the separate feed inlets 106, 108 of the slurry distributor 104. The first and second feed flows are respectively directed from the flow splitter 200 through the first and second delivery branches 116, 118 to the first and second feed inlets 106, 108 of the slurry distributor 104. In the slurry distributor, the first and second feed flows are redirected and combined back together such that the combined first and second flows of aqueous cementitious slurry are moving in the outlet flow direction 192, which is substantially aligned with the machine direction 50. The re-combined first and second flows of aqueous cementitious slurry are discharged from the distribution outlet 110 of the slurry distributor substantially moving substantially along the machine direction 50.

Referring to FIGS. 3-8, an embodiment of the flow splitter 200, which is constructed according to principles of the present disclosure, is shown. An embodiment of a flow splitter constructed in accordance with principles of the present disclosure can advantageously be configured as a retrofit component in an existing wallboard manufacturing system. The flow splitter 200 can be placed in fluid communication with a cementitious slurry mixer 102 and a slurry distributor 104, for example, as shown in FIG. 1, to deliver separated flows of aqueous cementitious slurry to the slurry distributor.

The flow splitter 200 can be made from any suitable material, such as a flexible material, including poly vinyl chloride (PVC), urethane, or any other suitable resiliently flexible material. In other embodiments, the flow splitter 200 can be made from other materials, such as a substantially rigid material (e.g., aluminum, stainless steel, etc.).

The flow splitter 200 includes the inlet conduit 202, which in the illustrated embodiment is substantially cylindrical and is adapted to receive a main flow of slurry from a mixer, and the pair of outlet conduits 204, 206, which in the illustrated embodiment are substantially cylindrical and each in fluid communication with the inlet conduit 202. The outlet conduits 204, 206 can be adapted to dispense two separate outlet flows of slurry from the flow splitter 200. It should be understood, however, that one skilled in the art may choose to reverse the flow of slurry through the flow splitter 200 to, in effect, render it a flow combiner.

Figure 3:
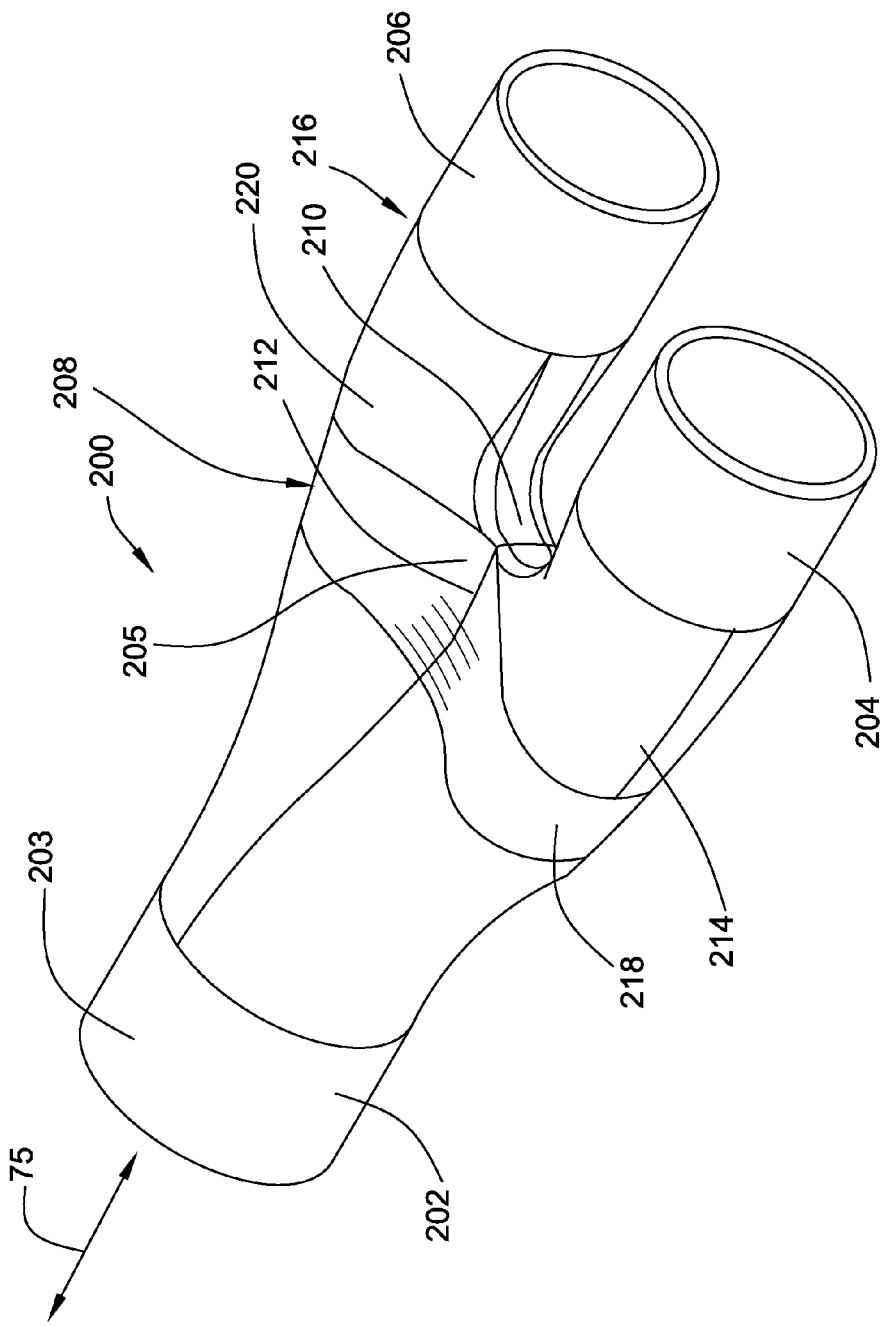
FIG. 3 is a perspective view of an embodiment of a flow splitter constructed in accordance with principles of the present disclosure and suitable for use in a cementitious slurry mixing and dispensing assembly.

Referring to FIG. 3, the inlet conduit 202 includes an inlet end 203 and a junction end 205. The inlet conduit 202 is disposed along a main flow axis 75 extending between the inlet end 203 and the junction end 205 (see FIG. 6 also).

Figure 4:
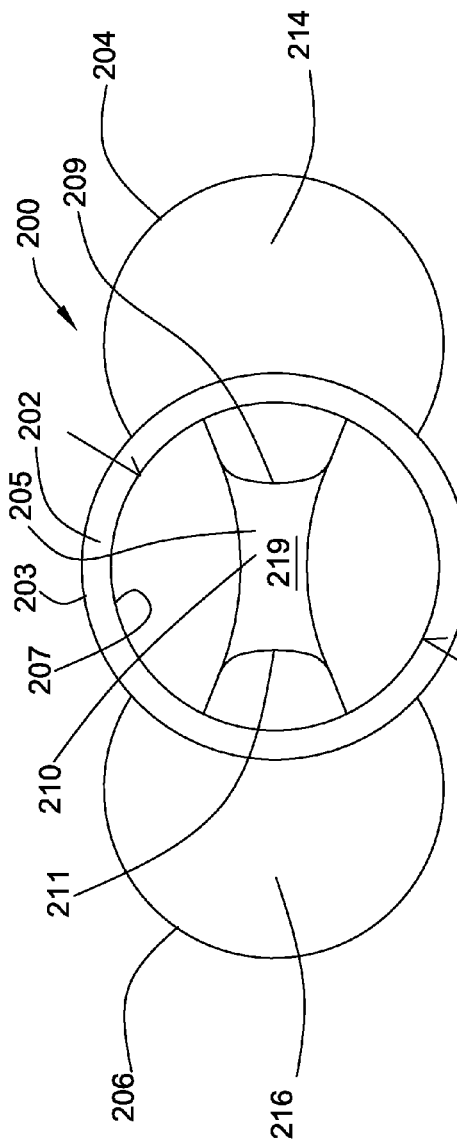
FIG. 4 is an inlet end elevational view of the flow splitter of FIG. 3.

Referring to FIG. 4, the inlet end 203 defines an inlet opening 207 adapted to be placed in fluid communication with a common delivery trunk in fluid communication with a cementitious slurry mixer and to receive a main flow of aqueous cementitious slurry from the common delivery trunk. The junction end 205 defines first and second junction openings 209, 211, respectively (see FIG. 7 also). The first junction opening 209 is disposed in spaced relationship to the second junction opening 211. The first and second junction openings 209, 211 are adapted to split the main flow of aqueous cementitious slurry into a first feed flow of aqueous cementitious slurry and a second feed flow of aqueous cementitious slurry.

Figure 5:
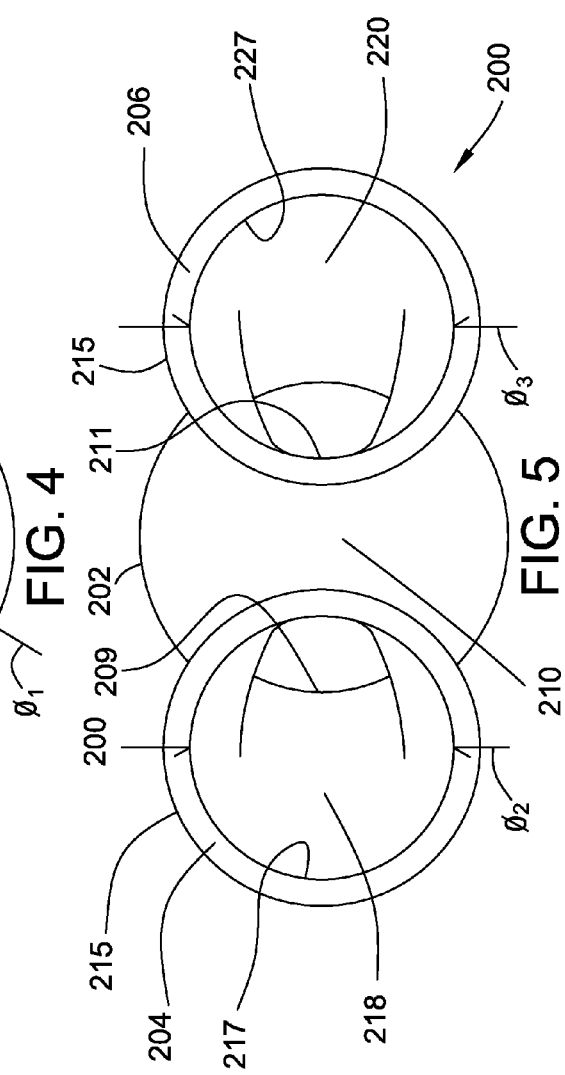
FIG. 5 is an outlet end elevational view of the flow splitter of FIG. 3.
Figure 6:
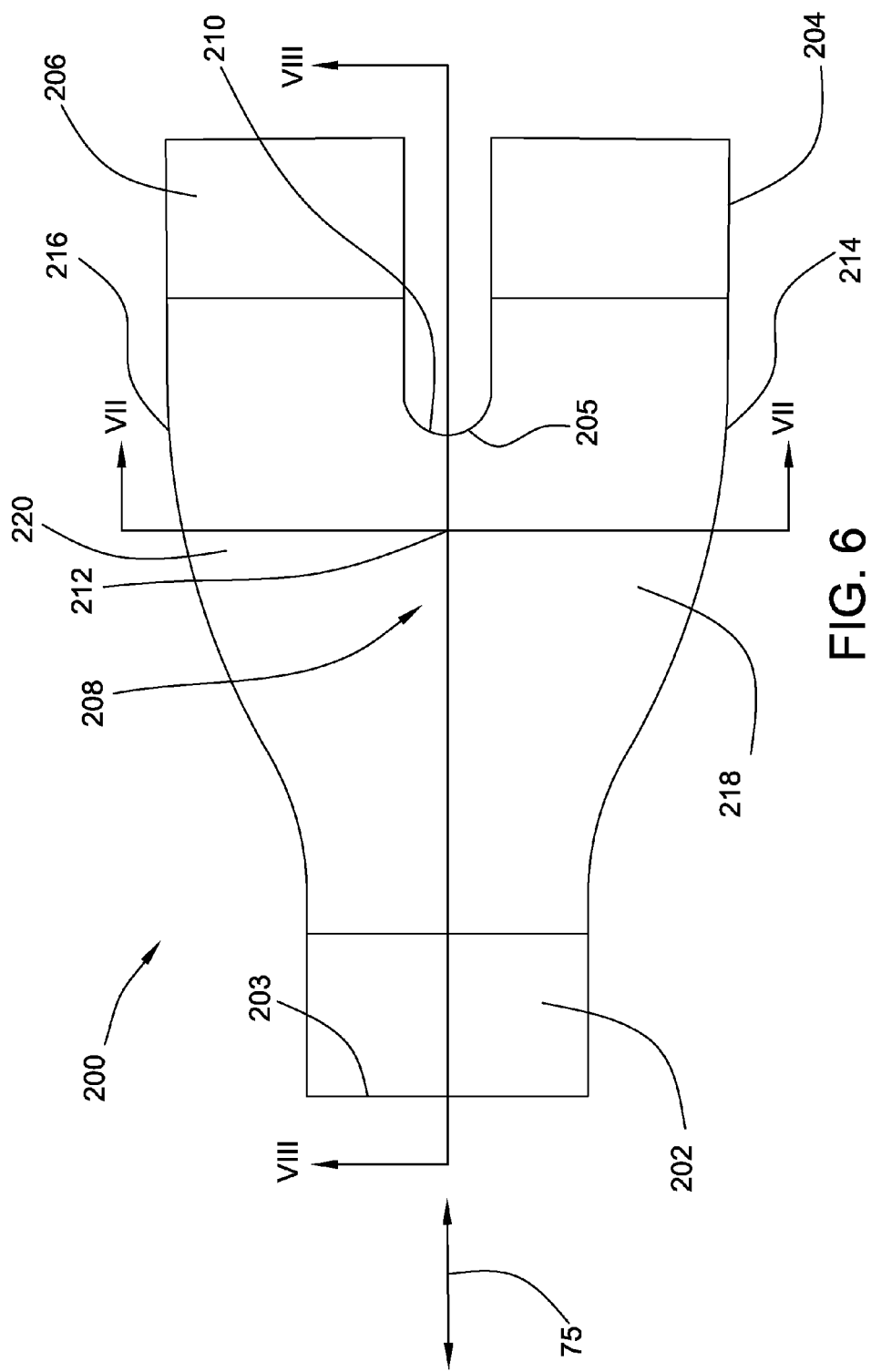
FIG. 6 is a top plan view of the flow splitter of FIG. 3.

Referring to FIG. 5, the first outlet conduit 204 is in fluid communication with the first junction opening 209 of the inlet conduit 202. The first outlet conduit 204 includes a discharge end 215 defining a first discharge opening 217. The first outlet conduit 204 is adapted to receive the first feed flow of aqueous cementitious slurry from the inlet conduit 202 and to dispense the first feed flow from the first discharge opening 217.

The second outlet conduit 206 is in fluid communication with the second junction opening 211 of the inlet conduit 202 the inlet conduit 202. The second outlet conduit 206 includes a discharge end 225 defining a second discharge opening 227. The second outlet conduit 206 is adapted to receive the second feed flow of aqueous cementitious slurry from the inlet conduit 202 and to dispense the second feed flow from the second discharge end 225.

Referring to FIG. 3, a junction portion 210 is disposed at the junction end 205 of the inlet conduit 202. Referring to FIGS. 4 and 5, the junction portion 210 is disposed between the first junction opening 209 and the second junction opening 211. The junction portion 210 includes a substantially planar wall region 219 (see FIGS. 7 and 8 also). Referring to FIG. 8, the wall region 219 is substantially perpendicular to the main flow axis 75.

Referring to FIGS. 4 and 5, the first discharge opening 217 of the first outlet conduit 204 and the second discharge opening 227 of the second outlet conduit 206 each can have a cross-sectional area less than or about equal to the cross-section area of the inlet opening 207 of the inlet conduit 202. In embodiments, the cross-sectional area of the first discharge opening 217 of the first outlet conduit 204 and the cross-sectional area of the second discharge opening 227 of the second outlet conduit 206 each is less than about 85% of the cross-section area of the inlet opening 207 of the inlet conduit 202. In some embodiments, the cross-sectional area of the first discharge opening 217 of the first outlet conduit 204 is substantially the same as the cross-sectional area of the second discharge opening 227 of the second outlet conduit 206.

In the illustrated embodiment, the inside diameter $Ø_1$ of the inlet opening 207 of the inlet conduit 202 is larger than the inside diameters $Ø_2$, $Ø_3$ of the first discharge opening 217 of the first outlet conduit 204 and the second discharge opening 227 of the second outlet conduit 206, respectively. In the illustrated embodiment, the respective inside diameters $Ø_2$, $Ø_3$ of the first discharge opening 217 of the first outlet conduit 204 and the second discharge opening 227 of the second outlet conduit 206 are substantially the same.

The inside diameters $Ø_1$, $Ø_2$, $Ø_3$ (and, thus, the cross-sectional areas) of the inlet opening 207 and the first and second discharge openings 217, 227 can vary depending on the desired average flow velocity. Higher average flow velocity reduces the chance of slurry buildup resulting from premature solidification of the slurry. The inside diameter $Ø_2$, $Ø_3$ of the first and second discharge openings 217, 227 can be made smaller than the inside diameter $Ø_1$ of the inlet opening 207 in order to maintain a relatively high flow velocity throughout the flow splitter 200. When the inside diameters $Ø_2$, $Ø_3$ of the first and second discharge openings 217, 227 are substantially equal to the inside diameter $Ø_1$ of the inlet opening 207, the average flow velocity of the slurry will be reduced by about 50% through the outlet conduits 204, 206 if the volumetric flow rate through the inlet and both outlets is substantially the same. When the inside diameters of the outlet 204, 206 are smaller than the inside diameter of the inlet 202, however, the flow velocity can be maintained in the outlet conduits 204, 206 or at least reduced to a lesser extent than if the discharge conduits 204, 206 and the inlet conduit 202 have substantially equal inside diameters $Ø_1$, $Ø_2$, $Ø_3$.

For example, in some embodiments, the flow splitter 200 has an inlet opening 207 with an inside diameter $Ø_1$ of about 3 inches, and the first and second discharge openings 217, 227 each has an inside diameter $Ø_2$, $Ø_3$ of about 2.5 inches (though other inlet and outlet inside diameters can be used in other embodiments). In an embodiment with these dimensions, the smaller inside diameter of the outlet conduits 204, 206 causes the average flow velocity in each outlet conduit 204, 206 to reduce by about 28% from the average flow velocity in the inlet conduit 202. This is an improvement over an about 50% reduction in average flow velocity that occurs if the inside diameters $Ø_1$, $Ø_2$, $Ø_3$ are substantially equal.

The flow splitter 200 also includes a central contoured portion 208. Referring to FIGS. 7 and 8, the inlet conduit defines 202 an inlet passage 231 extending between the inlet opening 207 and the first and second junction openings 209, 211. The inlet conduit 202 includes the contoured portion 208 which defines a flow restriction 235 in the inlet passage 231 adjacent the junction portion 210.

The contoured portion 208 includes an upper convex region 212 and an opposing lower convex region 213. The upper and lower convex regions 212, 213 project toward each other in the inlet passage 231 to define the flow restriction 235 therebetween.

Referring to FIG. 7, the contoured portion 208 defines first and second guide channels 218, 220. The flow restriction 235 is disposed laterally between the first and second guide channels 218, 220 along a transverse axis 85 substantially perpendicular to the main flow axis 75. The first and second guide channels 218, 220 are disposed laterally outwardly relative to the upper and lower convex regions 212, 213, respectively. The first and second guide channels 218, 220 each have a cross-sectional area greater than the cross-sectional area of the flow restriction 235. The first and second guide channels 218, 220 are substantially aligned with the first and second junction openings 209, 211, respectively.

The flow restriction 235 has a maximum height $H_1$ along a height axis 95. The height axis 95 is perpendicular to both the main flow axis 75 and the transverse axis 85. The first and second guide channels 218, 220 each have a maximum height $H_2$, $H_3$ along the height axis 95 which is larger than the maximum height $H_1$ of the flow restriction 235. In the illustrated embodiment, the first and second guide channels 218, 220 have substantially the same maximum height $H_2$, $H_3$ along the height axis 95.

The contour portion 208 includes the upper depression 212 in the top of the flow splitter 200 and the lower depression 213 in the bottom of the flow splitter 200 that helps promote flow to outer lateral edges 214, 216 of the splitter to reduce the occurrence of slurry buildup at the junction 210. As shown in the Figures, the shape of the central contoured portion 208 results in large channels 218, 220 disposed adjacent outer edges 214, 216 thereof. The depressions 212, 213 in the central portion 208 define the flow restriction 235 which has a smaller cross-sectional area than the cross-sectional area at the outer edges 214, 216 and a smaller height $H_2$, $H_3$ than found adjacent the outer edges $H_2$, $H_3$. As a result, the slurry flowing along the main flow axis 75 toward the junction 210 encounters less flow resistance in the guide channels 218, 220 disposed at the outer edges 214, 216. Therefore, flow is directed toward large channels 218, 220 at the flow splitter's 200 outer edges 214, 216 and away from the central portion 208 and the junction 210.

The junction 210 is disposed between the two outlets 204, 206. The junction 210 is made up of the planar wall 219 that is substantially perpendicular to the main flow axis 75 along which slurry will flow when entering the inlet opening 207 of the inlet conduit 202. The planar wall 219 is sized such that fibers and other additives in the aqueous cementitious slurry are impeded from wrapping around the junction 210 and building up at that site (a process also referred to as "stapling"). The planar wall 219 can be configured to help prevent slurry from adhering to the junction 210, building up, and eventually breaking off to cause lump formation.

The junction 210 can be configured to help prevent slurry buildup in a region just upstream of the junction 210. If this buildup does occur, however, it can disrupt the flow of slurry, which can cause the split of slurry flow to become uneven and/or interrupted. The trapped buildup of slurry can harden and set, that in time can eventually break away, causing hard lumps to be carried in the slurry flow which can cause process problems and interruptions, such as paper breaks at the forming station.

Figure 9:
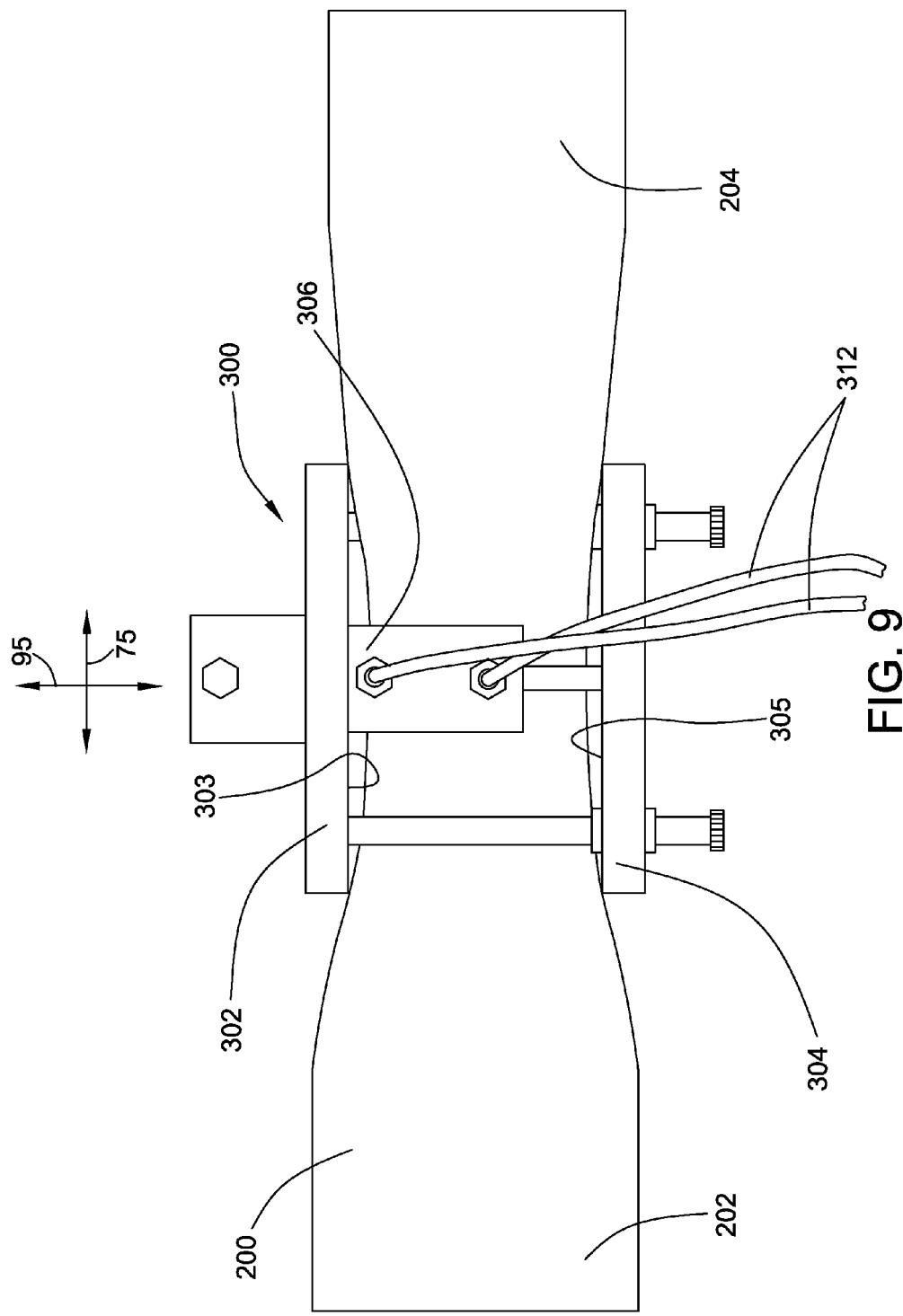
FIG. 9 is a side elevational view of the flow splitter of FIG. 3 disposed within an embodiment of a squeezing apparatus constructed in accordance with principles of the present disclosure.
Figure 10:
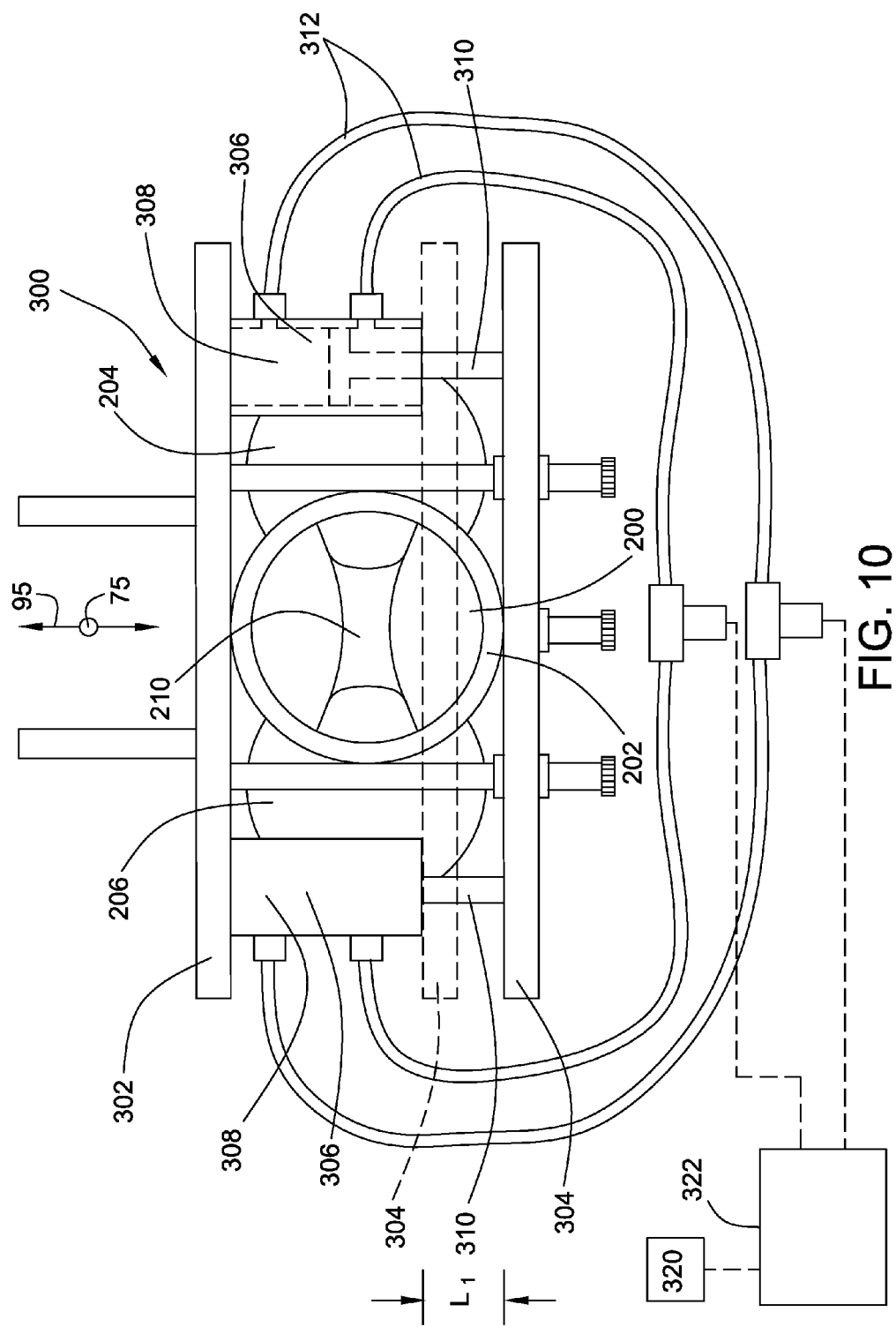
FIG. 10 is an inlet end elevational view of the flow splitter of FIG. 3 and the squeezing apparatus of FIG. 9.
Figure 11:
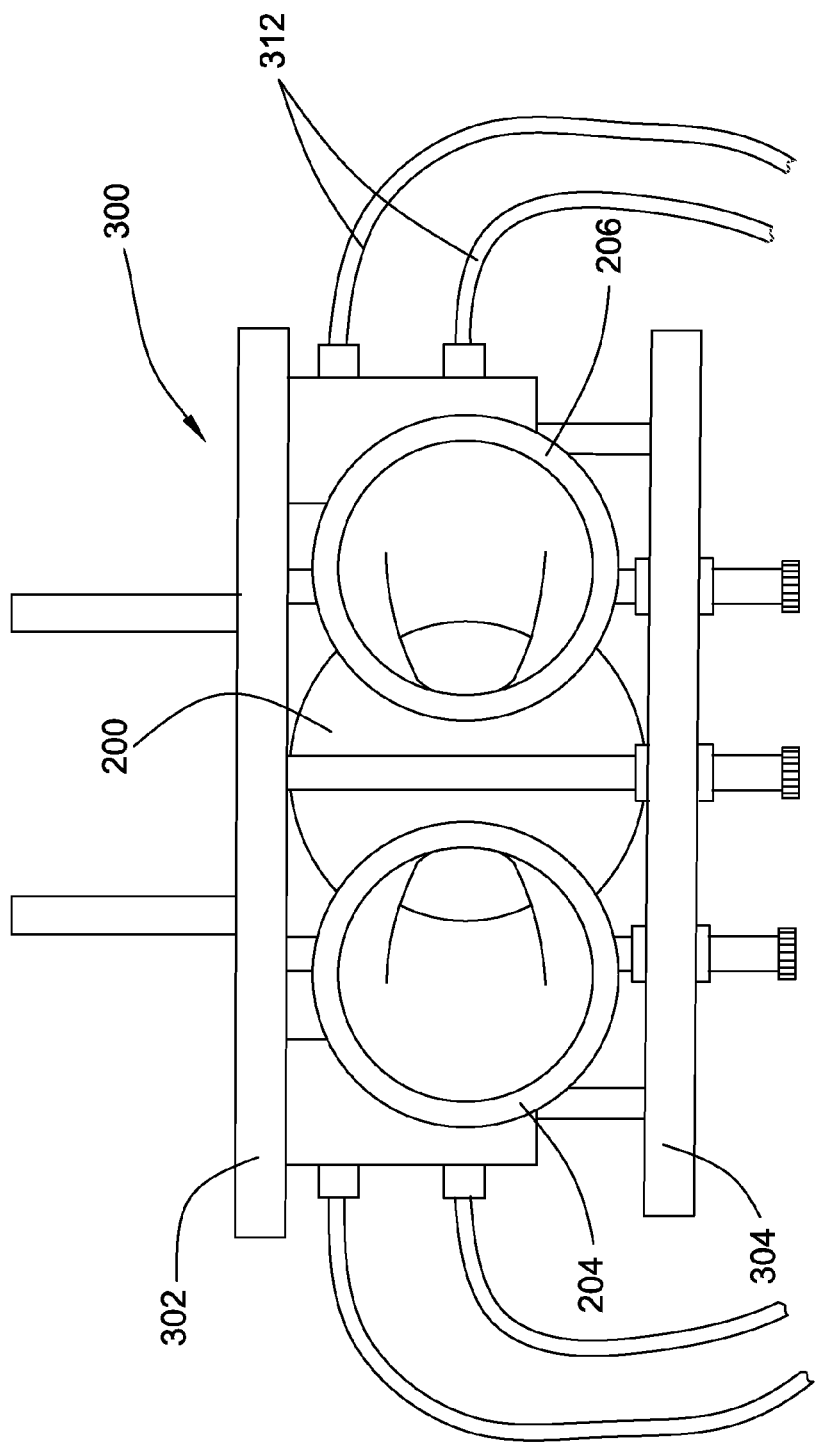
FIG. 11 is an outlet end elevational view of the flow splitter of FIG. 2 and the squeezing apparatus of FIG. 9.

Referring to FIGS. 9-11, an embodiment of a compressing device or automatic squeezing apparatus 300 for compressing the flow splitter 200 at adjustable and regular time intervals can be provided to help prevent slurry from building up inside the flow splitter. The squeezing apparatus 300 addresses potential cleanliness issues associated with the flow splitter 200 as it splits a main flow of incoming cementitious slurry into two outlet flow streams. The squeezing apparatus 300 squeezes a central portion 208 of the flow splitter 200 to help reduce buildup of set slurry at the junction 210.

The compressing device 300 includes first and second compressing members 302, 304 disposed in spaced relationship to each other. The junction portion 210 of the flow splitter 200 is disposed between the first and second compressing members 302, 304. At least one of the first and second compressing members 302, 304 is movable over a range of travel relative to the other compressing member 304 along a compressing axis 95, which is substantially perpendicular to the main flow axis 75, between a normal position and a compressed position (see second compressing member 304 shown in phantom in FIG. 10). In the compressed position, a portion of at least one of the inlet conduit 202 and the first and second outlet conduits 204, 206 adjacent the junction portion 210 is compressed relative to the normal position. In embodiments, the junction portion 210 is compressed when in the compressing members 302, 304 are in the compressed position relative to the normal position.

The compressing members 302, 304 each comprise a substantially planar compressing surface 303, 305. The compressing surfaces 303, 305 are in substantially parallel relationship to each other and to the main flow axis 75.

Referring to FIG. 10, the compressing device 300 includes at least one actuator 306 adapted to selectively move the first compressing member 302 relative to the second compressing member 304. In the illustrated embodiment, the second compressing member 304, which is disposed below the flow splitter 200, is movable, and the first compressing member 302 is stationary. In other embodiments, other movement arrangements are possible.

The compressing device 300 can include a controller 320 adapted to control each actuator 306 such that the actuator 306 is periodically actuated according to a predetermined frequency to periodically compress the junction portion. The controller 320 can be adapted to control each actuator 306 such that the actuator 306 is actuated to move the first and second compressing members 302, 304 toward each other by a predetermined stroke length $L_1$ (see FIG. 10).

As shown in FIGS. 9-11, the squeezing apparatus 300 is disposed adjacent the junction 210 of the flow splitter 200. The first and second compressing members are in the form of an upper plate 302 and a lower plate 304. The upper plate 302 is positioned on the top of the flow splitter 200, and the lower plate 304 is positioned below the flow splitter 200. As best shown in FIG. 10, the illustrated squeezing apparatus 300 includes a pair of actuators 306 in the form of a pneumatic cylinder 308 with a reciprocally movable piston 310. Each actuator 306 is mounted to the upper plate 302 and the lower plate 304 such that, when the actuator is actuated, the piston 310 retracts and the lower plate 304 moves toward the upper plate 302 over a defined stroke length $L_1$ along the height axis 95 which is substantially perpendicular to the main flow axis 75. A pair of pneumatic lines 312 is connected to the pneumatic chamber 308 of each actuator 306 and to a source of pressurized air 322. The controller 320 is adapted to selectively control the source of pressurized air 322, such as with suitable electrically-operate valves, for example, to selectively operate the actuators 306 to retract the pistons 310 to compress the squeezing apparatus and to extend the pistons to return the plates 302, 304 to the normal position. The actuator 306 can be operated either automatically or selectively to move the plates 302, 304 together relative to each other to apply a compressive force upon the flow splitter 200 at the recessed central portion 208 and the junction 210. Moving the upper and lower plates 302, 304 closer to each other applies a compressive force that can cause the flow splitter 200 to flex inwardly at the junction 210 to discourage slurry build up.

When the squeezing apparatus 300 squeezes the flow splitter 200, the squeezing action applies compressive force to the flow splitter, which flexes inwardly in response. This force helps prevent buildup of solids that can disrupt the flow of slurry through the outlet conduits 204, 206 of the flow splitter 200. In some embodiments, the squeezing apparatus 300 is designed to automatically pulse through the use of a programmable controller operably arranged with the actuators 306. The squeezing apparatus 300 can be configured such that it actuates at varying stroke lengths and frequencies, which can be adjusted depending on production conditions. The squeezing apparatus 300 can also provide support for the flow splitter 200 to help maintain the internal geometry of the flow splitter and help prevent unwanted distortion, which can help maintain proper velocity and flow characteristics when slurry flows through the flow splitter 200.

Furthermore, it should be understood that, in other embodiments, the flow splitter can include more than two discharge conduits. In embodiments, an appropriately configured junction and/or contoured portion can be disposed between each pair of adjacent discharge conduits.

Figure 12:
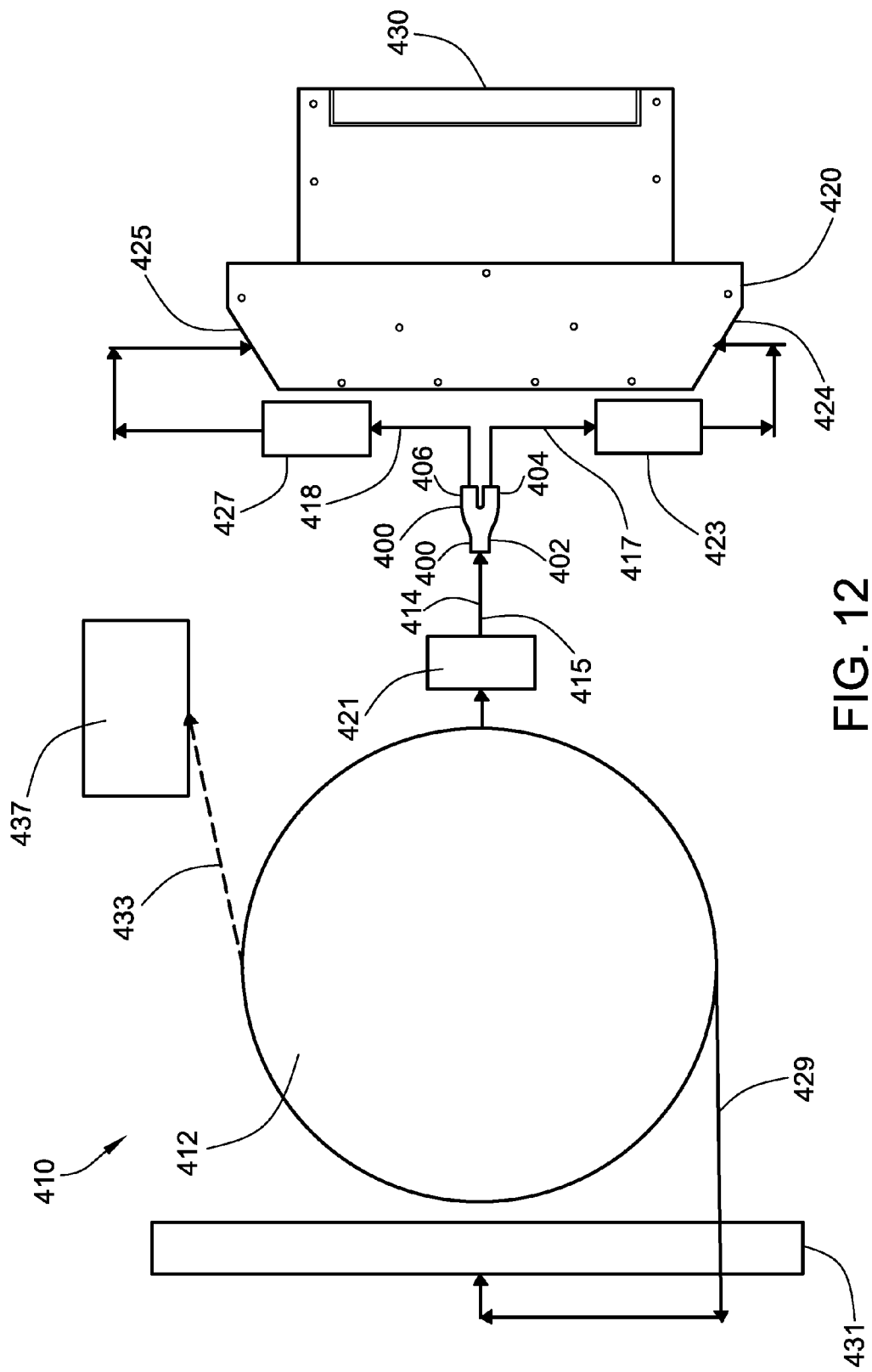
FIG. 12 is a schematic plan diagram of another embodiment of a cementitious slurry mixing and dispensing assembly including an embodiment of a flow splitter constructed in accordance with principles of the present disclosure.

Referring to FIG. 12, another embodiment of a cementitious slurry mixing and dispensing assembly 410 is shown, which is particularly adapted for mixing and dispensing aqueous calcined gypsum slurry. The gypsum slurry mixing and dispensing assembly 410 includes a gypsum slurry mixer 412 in fluid communication with a flow splitter 400 and a slurry distributor 420. The gypsum slurry mixer 412 is adapted to agitate water and a cementitious to form an aqueous calcined gypsum slurry.

The flow splitter 400 is disposed between the gypsum slurry mixer 412 and the slurry distributor 420. The flow splitter 400 can be similar in construction to flow splitter 200 in FIGS. 3-8.

The slurry distributor 420 can be similar in construction and function to the slurry distributor 104 of FIG. 1. In other embodiments, other suitable slurry distributors can be used, such as those shown and described in U.S. patent application Ser. No. 13/341,209 (U.S. Patent Application Publication No. US 2012/0170403), for example.

A delivery conduit 414 is disposed between and in fluid communication with the gypsum slurry mixer 412, the flow splitter 400, and the slurry distributor 420. The delivery conduit 414 includes a common delivery trunk 415 in fluid communication with an inlet conduit 402 of the flow splitter 400, a first delivery branch 417 in fluid communication with a first outlet conduit 404 of the flow splitter 400 and a first feed inlet 424 of the slurry distributor 420, and a second delivery branch 418 in fluid communication with a second outlet conduit 406 of the flow splitter 400 and a second feed inlet 425 of the slurry distributor 420.

The common delivery trunk 415 is disposed between and in fluid communication with the gypsum slurry mixer 412 and both the first and the second delivery branches 417, 418 through the flow splitter 400. An aqueous foam supply conduit 421 can be in fluid communication with at least one of the gypsum slurry mixer 412 and the delivery conduit 414. In the illustrated embodiment, the aqueous foam supply conduit 421 is associated with the common delivery trunk 415 of the delivery conduit 414.

The first delivery branch 417 is disposed between and in fluid communication with the gypsum slurry mixer 412 (through the common delivery trunk 415 and the flow splitter 400) and the first feed inlet 424 of the slurry distributor 420. At least one first flow-modifying element 423 is associated with the first delivery branch 417 and is adapted to control the first flow of aqueous calcined gypsum slurry dispensed from the first outlet conduit 404 of the flow splitter 400.

The second delivery branch 418 is disposed between and in fluid communication with the gypsum slurry mixer 412 (through the common delivery trunk 415 and the flow splitter 400) and the second feed inlet 425 of the slurry distributor 420. At least one second flow-modifying element 427 is associated with the second delivery branch 418 and is adapted to control the second flow of aqueous calcined gypsum slurry dispensed from the second outlet conduit 406 of the flow splitter 400.

The first and second flow-modifying elements 423, 427 can be operated to control an operating characteristic of the first and second flows of aqueous calcined gypsum slurry. The first and second flow-modifying elements 423, 427 can be independently operable. In some embodiments, the first and second flow-modifying elements 423, 427 can be actuated to help balance the first and second feed flows discharged from the first and second outlet conduits 404, 406 of the flow splitter, respectively, such that the average velocity and/or the volumetric flow rate of the first and second feed flows are substantially equal to each other. In other embodiments, he first and second flow-modifying elements 423, 427 can be actuated to help adjust the discharge flow of the combined first and second flows of slurry from a discharge outlet 430 of the slurry distributor 420.

In some embodiments, the first and second flow-modifying elements 423, 427 can be actuated to deliver first and second flows of slurry that alternate between a relatively slower and relatively faster average velocity in opposing fashion such that at a given time the first slurry has an average velocity that is faster than that of the second flow of slurry and at another point in time the first slurry has an average velocity that is slower than that of the second flow of slurry.

As one of ordinary skill in the art will appreciate, one or both of the webs of cover sheet material can be pre-treated with a very thin relatively denser layer of gypsum slurry (relative to the gypsum slurry comprising the core), often referred to as a skim coat in the art, and/or hard edges, if desired. To that end, the mixer 412 includes a first auxiliary conduit 429 that is adapted to deposit a stream of dense aqueous calcined gypsum slurry that is relatively denser than the first and second flows of aqueous calcined gypsum slurry delivered to the slurry distributor (i.e., a "face skim coat/hard edge stream"). The first auxiliary conduit 429 can deposit the face skim coat/hard edge stream upon a moving web of cover sheet material upstream of a skim coat roller 431 that is adapted to apply a skim coat layer to the moving web of cover sheet material and to define hard edges at the periphery of the moving web by virtue of the width of the roller 431 being less than the width of the moving web as is known in the art. Hard edges can be formed from the same dense slurry that forms the thin dense layer by directing portions of the dense slurry around the ends of the roller used to apply the dense layer to the web.

The mixer 412 can also include a second auxiliary conduit 433 adapted to deposit a stream of dense aqueous calcined gypsum slurry that is relatively denser than the first and second flows of aqueous calcined gypsum slurry delivered to the slurry distributor (i.e., a "back skim coat stream"). The second auxiliary conduit 433 can deposit the back skim coat stream upon a second moving web of cover sheet material upstream (in the direction of movement of the second web) of a skim coat roller 437 that is adapted to apply a skim coat layer to the second moving web of cover sheet material as is known in the art (see FIG. 13 also).

In other embodiments, separate auxiliary conduits can be connected to the mixer to deliver one or more separate edge streams to the moving web of cover sheet material. Other suitable equipment (such as auxiliary mixers) can be provided in the auxiliary conduits to help make the slurry therein denser, such as by mechanically breaking up foam in the slurry and/or by chemically breaking down the foam through use of a suitable de-foaming agent.

In yet other embodiments, first and second delivery branches can each include a foam supply conduit therein which are respectively adapted to independently introduce aqueous foam into the first and second flows of aqueous calcined gypsum slurry delivered to the slurry distributor. It will be appreciated that other embodiments are possible.

The gypsum slurry mixing and dispensing assembly 410 of FIG. 12 can be similar in other respects to the gypsum slurry mixing and dispensing assembly 810 of FIG. 1. It is further contemplated that other flow splitters constructed in accordance with principles of the present disclosure and other slurry distributors can be used in other embodiments of a gypsum slurry mixing and dispensing assembly as described herein.

Figure 13:
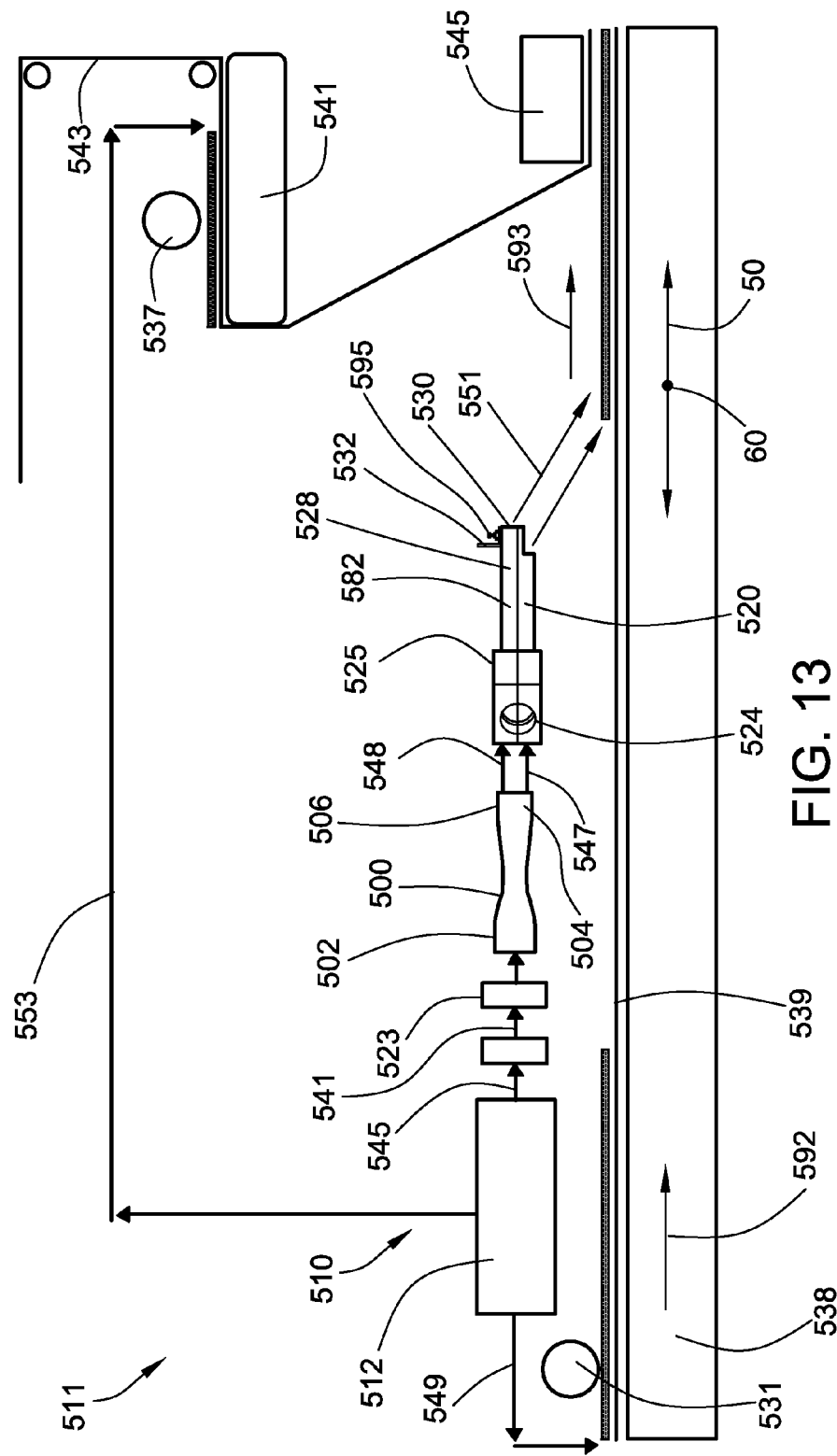
FIG. 13 is a schematic elevational diagram of an embodiment of a wet end of a gypsum wallboard manufacturing line including an embodiment of a flow splitter constructed in accordance with principles of the present disclosure.

Referring to FIG. 13, an exemplary embodiment of a wet end 511 of a gypsum wallboard manufacturing line is shown. The wet end 511 includes a gypsum slurry mixing and dispensing assembly 510 having a gypsum slurry mixer 512 in fluid communication with a flow splitter 400 and a slurry distributor 420, a hard edge/face skim coat roller 531 disposed upstream of the slurry distributor 520 and supported over a forming table 538 such that a first moving web 539 of cover sheet material is disposed therebetween, a back skim coat roller 537 disposed over a support element 541 such that a second moving web 543 of cover sheet material is disposed therebetween, and a forming station 545 adapted to shape the preform into a desired thickness. The skim coat rollers 531, 537, the forming table 538, the support element 541, and the forming station 545 can all comprise conventional equipment suitable for their intended purposes as is known in the art. The wet end 511 can be equipped with other conventional equipment as is known in the art.

The gypsum slurry mixer 512 is adapted to agitate water and calcined gypsum to form an aqueous calcined gypsum slurry. The flow splitter 500 is disposed between the gypsum slurry mixer 512 and the slurry distributor 520. The flow splitter 500 can be similar in construction to flow splitter 200 in FIGS. 3-8. The slurry distributor 520 can be similar in construction and function to the slurry distributor 104 of FIG. 1. In other embodiments, other suitable slurry distributors can be used, such as those shown and described in U.S. patent application Ser. No. 13/341,209 (U.S. Patent Application Publication No. US 2012/0170403), for example.

In another aspect of the present disclosure, a flow splitter constructed in accordance with principles of the present disclosure can be used in a variety of manufacturing processes. For example, in one embodiment, a flow splitter can be used in a method of preparing a gypsum product. A flow splitter can be used to split a main flow of aqueous calcined gypsum slurry discharged from the mixer 512 into at least two feed flows of aqueous calcined gypsum slurry which are directed to the slurry distributor 520 for recombination therein. Those aspects of a method of preparing a cementitious product not specifically described herein can be supplied by the techniques known and used in the manufacture of conventional cementitious products.

Water and calcined gypsum can be mixed in the mixer 512 to form an aqueous calcined gypsum slurry. In some embodiments, the water and calcined gypsum can be continuously added to the mixer in a water-to-calcined gypsum ratio from about 0.5 to about 1.3, and in other embodiments of about 0.75 or less.

Gypsum board products are typically formed "face down" such that the advancing web 539 serves as the "face" cover sheet of the finished board. A face skim coat/hard edge stream 549 (a layer of denser aqueous calcined gypsum slurry relative to at least one of the first and second flows of aqueous calcined gypsum slurry) can be applied to the first moving web 539 upstream of the hard edge/face skim coat roller 531, relative to the machine direction 592, to apply a skim coat layer to the first web 539 and to define hard edges of the board.

A main flow 545 of aqueous calcined gypsum slurry is discharged from the mixer 512 into a dispensing assembly 541 including the flow splitter 500. The main flow of aqueous calcined gypsum slurry enters an inlet conduit 502 of the flow splitter 500 and is split therein between a first outlet conduit 504 and a second outlet conduit 506 to define first and second feed flows 547, 548, respectively. The first feed flow 547 and the second feed flow 548 of aqueous calcined gypsum slurry pass from the first and second outlet conduits 504, 506, respectively, of the flow splitter 500 and are respectively passed through a first feed inlet 524 and a second feed inlet 525 of the slurry distributor 520.

In embodiments, the first feed flow 547 of aqueous calcined gypsum and the second feed flow 548 of aqueous calcined gypsum slurry each has an average velocity that is at least about 50% of the average velocity of the main flow 545 of aqueous calcined gypsum slurry. In embodiments, the first feed flow 547 of aqueous calcined gypsum and the second feed flow 548 of aqueous calcined gypsum slurry each has an average velocity that is at least about 70% of the average velocity of the main flow 545 of aqueous calcined gypsum slurry.

The first and second flows 547, 548 of aqueous calcined gypsum slurry can have at least one flow characteristic that is substantially similar, such as average velocity, for example. The first and second flows 547, 548 of aqueous calcined gypsum slurry are re-combined in the slurry distributor 520. The first and second flows 547, 548 of aqueous calcined gypsum slurry move along a flow path through the slurry distributor 520 in the manner of a streamline flow, undergoing minimal or substantially no air-liquid slurry phase separation and substantially without undergoing a vortex flow path.

The first moving web 539 moves along the longitudinal axis 50. The first flow 547 of aqueous calcined gypsum slurry passes through the first feed inlet 524, and the second flow 548 of aqueous calcined gypsum slurry passes through the second feed inlet 525. The distribution conduit 528 is positioned such that it extends along the longitudinal axis 50 which substantially coincides with the machine direction 592 along which the first web 539 of cover sheet material moves. Preferably, the central midpoint of the distribution outlet 530 (taken along the transverse axis/cross-machine direction 60) substantially coincides with the central midpoint of the first moving cover sheet 539. The first and second flows 547, 548 of aqueous calcined gypsum slurry re-combine in the slurry distributor 520 such that the combined first and second flows 551 of aqueous calcined gypsum slurry pass through the distribution outlet 530 in a distribution direction 593 generally along the machine direction 592.

In some embodiments, the distribution conduit 528 is positioned such that it is substantially parallel to the plane defines by the longitudinal axis 50 and the transverse axis 60 of the first web 539 moving along the forming table. In other embodiments, the entry portion of the distribution conduit can be disposed vertically lower or higher than the distribution outlet 530 relative to the first web 539.

The combined first and second flows 551 of aqueous calcined gypsum slurry are discharged from the slurry distributor 520 upon the first moving web 539. The face skim coat/hard edge stream 549 can be deposited from the mixer 512 at a point upstream, relative to the direction of movement of the first moving web 539 in the machine direction 592, of where the first and second flows 547, 548 of aqueous calcined gypsum slurry are discharged from the slurry distributor 520 upon the first moving web 539. The combined first and second flows 547, 548 of aqueous calcined gypsum slurry can be discharged from the slurry distributor with a reduced momentum per unit width along the cross-machine direction relative to a conventional boot design to help prevent "washout" of the face skim coat/hard edge stream 549 deposited on the first moving web 539 (i.e., the situation where a portion of the deposited skim coat layer is displaced from its position upon the moving web 539 in response to the impact of the slurry being deposited upon it).

The first and second flows 547, 548 of aqueous calcined gypsum slurry respectively passed through the first and second feed inlets 524, 525 of the slurry distributor 520 can be selectively controlled with at least one flow-modifying element 523. For example, in some embodiments, the first and second flows 547, 548 of aqueous calcined gypsum slurry are selectively controlled such that the average velocity of the first flow 547 of aqueous calcined gypsum slurry passing through the first feed inlet 524 and the average velocity of the second flow 548 of aqueous calcined gypsum slurry passing through the second feed inlet 525 are substantially the same.

In embodiments, the first flow 547 of aqueous calcined gypsum slurry is passed at an average first feed velocity through the first feed inlet 524 of the slurry distributor 520. The second flow 548 of aqueous calcined gypsum slurry is passed at an average second feed velocity through the second feed inlet 525 of the slurry distributor 520. The second feed inlet 525 is in spaced relationship to the first feed inlet 524. The first and second flows 551 of aqueous calcined gypsum slurry are combined in the slurry distributor 520. The combined first and second flows 551 of aqueous calcined gypsum slurry are discharged at an average discharge velocity from a distribution outlet 530 of the slurry distributor 520 upon the web 539 of cover sheet material moving along a machine direction 592. The average discharge velocity is less than the average first feed velocity and the average second feed velocity.

In some embodiments, the average discharge velocity is less than about 90% of the average first feed velocity and the average second feed velocity. In some embodiments, the average discharge velocity is less than about 80% of the average first feed velocity and the average second feed velocity.

The combined first and second flows 551 of aqueous calcined gypsum slurry are discharged from the slurry distributor 520 through the distribution outlet 530. The opening of the distribution outlet 530 has a width extending along the transverse axis 60 and sized such that the ratio of the width of the first moving web 539 of cover sheet material to the width of the opening of the distribution outlet 530 is within a range including and between about 1:1 and about 6:1. In some embodiments, the ratio of the average velocity of the combined first and second flows 551 of aqueous calcined gypsum slurry discharging from the slurry distributor 520 to the velocity of the moving web 539 of cover sheet material moving along the machine direction 592 can be about 2:1 or less in some embodiments, and from about 1:1 to about 2:1 in other embodiments.

The combined first and second flows 551 of aqueous calcined gypsum slurry discharging from the slurry distributor 520 form a spread pattern upon the moving web 539. At least one of the size and shape of the distribution outlet 530 can be adjusted via a profiling system 532 mounted to the slurry distributor 520, which in turn can change the spread pattern. The profiling system 532 can include a plurality of adjustment bolts 595 disposed in spaced relationship to each other along the distribution outlet 530 in the cross-machine direction 60. Each adjustment bolt 595 can be independently adjusted to change the size and/or shape of the opening of the distribution outlet 530. The profiling system 532 can be similar in construction and function to those shown and described in U.S. patent application Ser. No. 13/341,209 (U.S. Patent Application Publication No. US 2012/0170403).

Thus, slurry is fed into both feed inlets 524, 525 of the feed conduit 522 and then exits through the distribution outlet 530 with an adjustable gap. A converging portion 582 can provide a slight increase in the slurry velocity so as to reduce unwanted exit effects and thereby further improve flow stability at the free surface. Side-to-side flow variation and/or any local variations can be reduced by performing cross-machine (CD) profiling control at the discharge outlet 530 using the profiling system 532. This distribution system can help prevent air-liquid slurry separation in the slurry resulting in a more uniform and consistent material delivered to the forming table 538.

A back skim coat stream 553 (a layer of denser aqueous calcined gypsum slurry relative to at least one of the first and second flows 547, 548 of aqueous calcined gypsum slurry) can be applied to the second moving web 543. The back skim coat stream 553 can be deposited from the mixer 512 at a point upstream, relative to the direction of movement of the second moving web 543, of the back skim coat roller 537.

In other embodiments, the average velocity of the first and second flows 547, 548 of aqueous calcined gypsum slurry are varied. In some embodiments, the slurry velocities at the feed inlets 524, 525 of the feed conduit 522 can oscillate periodically between relatively higher and lower average velocities (at one point in time one inlet has a higher velocity than the other inlet, and then at a predetermined point in time vice versa) to help reduce the chance of buildup within the geometry itself.

In embodiments of a method of preparing a cementitious product, a main flow of aqueous cementitious slurry is discharged from a mixer. The main flow of aqueous cementitious slurry from the mixer is split into a first feed flow of aqueous cementitious slurry and a second feed flow of aqueous cementitious slurry. The first feed flow of aqueous cementitious slurry is passed through a first feed inlet of a slurry distributor. The second feed flow of aqueous cementitious slurry is passed through a second feed inlet of the slurry distributor. The second feed inlet is in spaced relationship to the first feed inlet. The first and second feed flows of aqueous cementitious slurry are recombined in the slurry distributor. The first feed flow of aqueous cementitious slurry and the second feed flow of aqueous cementitious slurry each has an average velocity that is at least about 50% of the average velocity of the main flow of aqueous cementitious slurry. In embodiments, the first and second feed flows of aqueous cementitious slurry each has an average velocity that is at least about 75% of the average velocity of the main flow of aqueous cementitious slurry. In embodiments, a method of preparing a cementitious product can include discharging the combined first and second feed flows of aqueous cementitious slurry from the slurry distributor upon a web of cover sheet material moving along a machine direction.

In embodiments, splitting the main flow of aqueous cementitious slurry from the mixer into a first feed flow of aqueous cementitious slurry and a second feed flow of aqueous cementitious slurry can include passing the main flow of slurry through a flow splitter having an inlet conduit with a flow restriction upstream of a junction portion separating first and second outlet conduits. The flow restriction can be configured to urge the main flow of aqueous cementitious slurry away from the junction into separate outlet conduits of the flow splitter.

In embodiments, first and second guide channels are disposed in flanking relationship to the flow restriction. The first and second guide channels can be in substantial respective alignment with first and second junction openings leading to the first and second outlet conduits, respectively.

In embodiments, a method of preparing a cementitious product can include compressing a junction portion of a flow splitter used to split the main flow of aqueous cementitious slurry from the mixer into the first and second feed flows of aqueous cementitious slurry and a second feed flow of aqueous cementitious slurry. The junction portion can be disposed between a first outlet conduit and a second outlet conduit of the flow splitter. In embodiments, the junction portion can be compressed periodically according to a predetermined frequency. In embodiments, compressing the junction portion includes moving first and second compressing members toward each other by a predetermined stroke length.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flow splitter comprising:
   an inlet conduit including an inlet end and a junction end, the inlet conduit disposed along a main flow axis extending between the inlet end and the junction end, the inlet end defining an inlet opening, the junction end defining first and second junction openings, the first junction opening being disposed in spaced relationship to the second junction opening, the inlet conduit defining an inlet passage extending between the inlet opening and the first and second junction openings;
   a first outlet conduit in fluid communication with the first junction opening of the inlet conduit, the first outlet conduit including a discharge end defining a first discharge opening;
   a second outlet conduit in fluid communication with the second junction opening of the inlet conduit, the second outlet conduit including a discharge end defining a second discharge opening; and
   a junction portion disposed at the junction end of the inlet conduit, the junction portion disposed between the first junction opening and the second junction opening, the junction portion including a substantially planar wall region, the wall region being substantially perpendicular to the main flow axis;
   wherein the inlet conduit includes a contoured portion that defines a flow restriction in the inlet passage adjacent the junction portion, the contoured portion defining first and second guide channels, the flow restriction disposed laterally between the first and second guide channels along a transverse axis substantially perpendicular to the main flow axis, the first and second guide channels each having a cross-sectional area greater than the cross-sectional area of the flow restriction, the flow restriction having a maximum height along a height axis, the height axis being perpendicular to both the main flow axis and the transverse axis, and the first and second guide channels each having a maximum height along the height axis which is larger than the maximum height of the flow restriction.

2. The flow splitter of claim 1, wherein the inlet opening of the inlet conduit has a cross-sectional area, the first discharge opening of the first outlet conduit has a cross-sectional area less than or about equal to the cross-section area of the inlet opening of the inlet conduit, and the second discharge opening of the second outlet conduit has a cross-sectional area less than or about equal to the cross-section area of the inlet opening of the inlet conduit.

3. The flow splitter of claim 2, wherein the cross-sectional area of the first discharge opening of the first outlet conduit is substantially the same as the cross-sectional area of the second discharge opening of the second outlet conduit.

4. The flow splitter of claim 2, wherein the cross-sectional area of the first discharge opening of the first outlet conduit is less than about 85% of the cross-section area of the inlet opening of the inlet conduit, and the cross-sectional area of the second discharge opening of the second outlet conduit is less than about 85% of the cross-section area of the inlet opening of the inlet conduit.

5. The flow splitter of claim 1, wherein the contoured portion includes an upper convex region and an opposing lower convex region, the upper and lower convex regions projecting toward each other in the inlet passage to define the flow restriction therebetween.

6. The flow splitter of claim 1, wherein the first and second guide channels are substantially aligned with the first and second junction openings, respectively.

7. The flow splitter of claim 1, wherein the contoured portion includes an upper convex region and an opposing lower convex region, the upper and lower convex regions projecting toward each other in the inlet passage to define the flow restriction therebetween, and the first and second guide channels disposed laterally outwardly relative to the upper and lower convex regions and being substantially aligned with the first and second junction openings, respectively.

8. The flow splitter of claim 1, further comprising:
   a compressing device including first and second compressing members disposed in spaced relationship to each other, the junction portion being disposed between the first and second compressing members, at least one of the first and second compressing members being movable over a range of travel relative to the other compressing member along a compressing axis, the compressing axis being substantially perpendicular to the main flow axis, between a normal position and a compressed position wherein a portion of at least one of the inlet conduit and the first and second outlet conduits adjacent the junction portion is compressed relative to the normal position.

9. The flow splitter of claim 8, wherein the compressing members each comprise a substantially planar compressing surface, the compressing surfaces being in substantially parallel relationship to each other and to the main flow axis.

10. The flow splitter of claim 8, wherein the compressing device includes an actuator adapted to selectively move the first compressing member relative to the second compressing member.

11. The flow splitter of claim 10, wherein the compressing device includes a controller adapted to control the actuator such that the actuator is periodically actuated according to a predetermined frequency to periodically compress the junction portion.

12. The flow splitter of claim 10, wherein the compressing device includes a controller adapted to control the actuator such that the actuator is actuated to move the first and second compressing members toward each other by a predetermined stroke length.

13. A flow splitter comprising:
an inlet conduit including an inlet end and a junction end, the inlet conduit disposed along a main flow axis extending between the inlet end and the junction end, the inlet end defining an inlet opening, the junction end defining first and second junction openings, the first junction opening being disposed in spaced relationship to the second junction opening, the inlet conduit defining an inlet passage extending between the inlet opening and the first and second junction openings;
a first outlet conduit in fluid communication with the first junction opening of the inlet conduit, the first outlet conduit including a discharge end defining a first discharge opening;
a second outlet conduit in fluid communication with the second junction opening of the inlet conduit, the second outlet conduit including a discharge end defining a second discharge opening; and
a junction portion disposed at the junction end of the inlet conduit, the junction portion disposed between the first junction opening and the second junction opening;
wherein the inlet conduit includes a contoured portion that defines a flow restriction in the inlet passage adjacent the junction portion, the contoured portion defining first and second guide channels, the flow restriction disposed laterally between the first and second guide channels along a transverse axis substantially perpendicular to the main flow axis, the first and second guide channels each having a cross-sectional area greater than the cross-sectional area of the flow restriction, the flow restriction having a maximum height along a height axis, the height axis being perpendicular to both the main flow axis and the transverse axis, and the first and second guide channels each having a maximum height along the height axis which is larger than the maximum height of the flow restriction.

14. The flow splitter of claim 13, wherein the inlet opening of the inlet conduit has a cross-sectional area, the first discharge opening of the first outlet conduit has a cross-sectional area less than or about equal to the cross-section area of the inlet opening of the inlet conduit, and the second discharge opening of the second outlet conduit has a cross-sectional area less than or about equal to the cross-section area of the inlet opening of the inlet conduit.

15. The flow splitter of claim 13, wherein the first and second guide channels are substantially aligned with the first and second junction openings, respectively.

16. The flow splitter of claim 13, further comprising:
a compressing device including first and second compressing members disposed in spaced relationship to each other, the contoured portion and the junction portion being disposed between the first and second compressing members, at least one of the first and second compressing members being movable over a range of travel relative to the other compressing member along a compressing axis, the compressing axis being substantially perpendicular to the main flow axis, between a normal position and a compressed position wherein at least one of the contoured portion and the junction portion is compressed relative to the normal position.

17. The flow splitter of claim 14, wherein the cross-sectional area of the first discharge opening of the first outlet conduit is substantially the same as the cross-sectional area of the second discharge opening of the second outlet conduit.

18. The flow splitter of claim 14, wherein the cross-sectional area of the first discharge opening of the first outlet conduit is less than about 85% of the cross-section area of the inlet opening of the inlet conduit, and the cross-sectional area of the second discharge opening of the second outlet conduit is less than about 85% of the cross-section area of the inlet opening of the inlet conduit.

19. The flow splitter of claim 13, wherein the contoured portion includes an upper convex region and an opposing lower convex region, the upper and lower convex regions projecting toward each other in the inlet passage to define the flow restriction therebetween.

20. The flow splitter of claim 13, wherein the contoured portion includes an upper convex region and an opposing lower convex region, the upper and lower convex regions projecting toward each other in the inlet passage to define the flow restriction therebetween, and the first and second guide channels disposed laterally outwardly relative to the upper and lower convex regions and being substantially aligned with the first and second junction openings, respectively.

21. The flow splitter of claim 16, wherein the compressing members each comprise a substantially planar compressing surface, the compressing surfaces being in substantially parallel relationship to each other and to the main flow axis.

22. The flow splitter of claim 16, wherein the compressing device includes an actuator adapted to selectively move the first compressing member relative to the second compressing member.

23. The flow splitter of claim 22, wherein the compressing device includes a controller adapted to control the actuator such that the actuator is periodically actuated according to a predetermined frequency to periodically compress the junction portion.

24. The flow splitter of claim 22, wherein the compressing device includes a controller adapted to control the actuator such that the actuator is actuated to move the first and second compressing members toward each other by a predetermined stroke length.

* * * * *